US012562307B2

(12) United States Patent
Yoshioka et al.

(10) Patent No.: US 12,562,307 B2
(45) Date of Patent: Feb. 24, 2026

(54) INDUCTOR COMPONENT AND METHOD OF MANUFACTURING INDUCTOR COMPONENT

(71) Applicant: Murata Manufacturing Co., Ltd., Kyoto-fu (JP)

(72) Inventors: Yoshimasa Yoshioka, Nagaokakyo (JP); Momoka Hori, Nagaokakyo (JP); Tomomi Higashiyama, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 635 days.

(21) Appl. No.: 18/065,283

(22) Filed: Dec. 13, 2022

(65) Prior Publication Data

US 2023/0187123 A1 Jun. 15, 2023

(30) Foreign Application Priority Data

Dec. 14, 2021 (JP) ................................ 2021-202738

(51) Int. Cl.

*H01F 5/00* (2006.01)
*H01F 27/28* (2006.01)
*H01F 27/32* (2006.01)
*H01F 41/04* (2006.01)

(52) U.S. Cl.

CPC ....... *H01F 27/323* (2013.01); *H01F 27/2823* (2013.01); *H01F 41/04* (2013.01)

(58) Field of Classification Search

CPC ..................................................... H01F 27/323
USPC ................................................. 336/199, 200
See application file for complete search history.

(56) References Cited

U.S. PATENT DOCUMENTS

| | | | | |
|---|---|---|---|---|
| 12,462,971 | B2 * | 11/2025 | Takeuchi | H01F 27/29 |
| 2017/0345551 | A1 * | 11/2017 | Yoshioka | H01F 27/2804 |
| 2019/0074125 | A1 * | 3/2019 | Yoshioka | H01F 27/2804 |
| 2020/0105457 | A1 * | 4/2020 | Yasuda | H01F 27/29 |
| 2020/0381158 | A1 * | 12/2020 | Yoshioka | H01F 27/2828 |
| 2023/0071379 | A1 * | 3/2023 | Kawaguchi | H01F 27/32 |
| 2023/0126614 | A1 * | 4/2023 | Suzuki | H01F 41/122 336/192 |

(Continued)

FOREIGN PATENT DOCUMENTS

| | | | |
|---|---|---|---|
| CN | 106298160 | A | 1/2017 |
| JP | 2007-242800 | A | 9/2007 |

(Continued)

*Primary Examiner* — Ronald Hinson
(74) *Attorney, Agent, or Firm* — Studebaker Brackett PLLC

(57) ABSTRACT

An inductor component includes an element body, a coil disposed in the element body, and a non-magnetic insulating layer configured to cover at least part of the coil. The element body has a first magnetic layer and a second magnetic layer stacked in order along a first direction. The coil has an inductor wiring extending along a plane orthogonal to the first direction between the first magnetic layer and the second magnetic layer. In a first section orthogonal to an extending direction of the inductor wiring, the inductor wiring has a top surface facing the first direction, a bottom surface facing a second direction as a reverse direction of the first direction, a first side surface facing a third direction orthogonal to the first direction, and a second side surface facing a fourth direction as a reverse direction of the third direction.

18 Claims, 12 Drawing Sheets

(56) References Cited

U.S. PATENT DOCUMENTS

| | | | | |
|---|---|---|---|---|
| 2023/0238170 | A1* | 7/2023 | Kawaguchi | H01F 41/046 336/200 |
| 2023/0352233 | A1* | 11/2023 | Suzuki | H01F 27/323 |

FOREIGN PATENT DOCUMENTS

| | | | |
|---|---|---|---|
| JP | 2021-068805 | A | 4/2021 |
| JP | 2022-152043 | A | 10/2022 |
| WO | 2019/044459 | A1 | 3/2019 |

* cited by examiner

INDUCTOR COMPONENT AND METHOD OF MANUFACTURING INDUCTOR COMPONENT

CROSS-REFERENCE TO RELATED APPLICATION

This application claims benefit of priority to Japanese Patent Application No. 2021-202738, filed Dec. 14, 2021, the entire content of which is incorporated herein by reference.

BACKGROUND

Technical Field

The present disclosure relates to an inductor component and a method of manufacturing an inductor component.

Background Art

As inductor components of the related art, an inductor component described in International Publication No. 2019/044459 is known. The inductor component includes an element body having a magnetic layer, a coil disposed in the element body and spirally wound along an axial direction, and a non-magnetic insulating layer disposed in the element body and covering the coil. The insulating layer has a cylindrical first portion covering the coil, and a second portion connected to a lower end side of the first portion and covering an entire region of an inner magnetic path and an outer magnetic path of the coil. In a section including an axis of the coil, an inner peripheral surface and an outer peripheral surface of the first portion are linear.

SUMMARY

However, in the existing inductor component, since the inner peripheral surface and the outer peripheral surface of the first portion of the insulating layer are linear in the section including the axis of the coil, adhesion between the insulating layer and the element body is not good. In addition, in the existing inductor component, the second portion of the insulating layer covers the entire region of the inner magnetic path and the outer magnetic path of the coil, and thus there is a possibility that efficiency of obtaining inductance decreases.

Thus, the present disclosure provides an inductor component capable of improving adhesion between an insulating layer and an element body and also improving inductor characteristics, and a method of manufacturing an inductor component.

An inductor component as an aspect of the present disclosure includes an element body, a coil disposed in the element body, and a non-magnetic insulating layer configured to cover at least part of the coil. The element body has a first magnetic layer and a second magnetic layer stacked in order along a first direction. The coil has an inductor wiring extending along a plane orthogonal to the first direction between the first magnetic layer and the second magnetic layer. In a first section orthogonal to an extending direction of the inductor wiring, the inductor wiring has a top surface facing the first direction, a bottom surface facing a second direction as a reverse direction of the first direction, a first side surface facing a third direction orthogonal to the first direction, and a second side surface facing a fourth direction as a reverse direction of the third direction. The insulating layer has a top surface portion located farther in the first direction than the top surface, a bottom surface portion located farther in the second direction than the bottom surface, a first side surface portion in contact with the first side surface, a second side surface portion in contact with the second side surface, a top surface protruding portion provided at at least one of a position at which the top surface protruding portion protrudes from the top surface portion farther in the third direction than the first side surface portion and a position at which the top surface protruding portion protrudes from the top surface portion farther in the fourth direction than the second side surface portion, and a bottom surface protruding portion provided at at least one of a position at which the bottom surface protruding portion protrudes from the bottom surface portion farther in the third direction than the first side surface portion and a position at which the bottom surface protruding portion protrudes from the bottom surface portion farther in the fourth direction than the second side surface portion. The bottom surface protruding portion is located between the first magnetic layer and the second magnetic layer. The first magnetic layer and the second magnetic layer are in contact with each other at a tip of the bottom surface protruding portion. A protruding length of the bottom surface protruding portion in a direction parallel to the third direction or the fourth direction is greater than a protruding length of the top surface protruding portion in the direction parallel to the third direction or the fourth direction.

According to the aspect, since the bottom surface protruding portion is located between the first magnetic layer and the second magnetic layer, and the protruding length of the bottom surface protruding portion in the direction parallel to the third direction or the fourth direction is greater than the protruding length of the top surface protruding portion in the direction parallel to the third direction or the fourth direction, adhesion between the first magnetic layer and the second magnetic layer can be ensured with the bottom surface protruding portion interposed therebetween. In addition, a contact area between the insulating layer and the element body is increased due to the top surface protruding portion, and additionally, since the top surface protruding portion bites into the element body, the adhesion between the insulating layer and the element body is improved. As described above, the adhesion between the insulating layer and the element body can be improved. In addition, since the first magnetic layer and the second magnetic layer are in contact with each other at the tip of the bottom surface protruding portion, it is possible to improve efficiency of obtaining inductance. As described above, according to the embodiment, the adhesion between the insulating layer and the element body can be improved, and inductor characteristics can also be improved.

Preferably, in the embodiment of the inductor component, the inductor wiring is present in each of multiple layers along the first direction. The multiple inductor wirings are connected in series and form one or more turns of the coil, and the third direction is an inner surface direction of the coil.

According to the present embodiment, since the bottom surface protruding portion protrudes into an inner magnetic path in which a contact area between the first magnetic layer and the second magnetic layer is relatively large, it is possible to improve the adhesion between the insulating layer and the element body.

Preferably, in the embodiment of the inductor component, three or more of the top surface protruding portion and the bottom surface protruding portion are present in the first section, and in the first section, at least three of the top surface protruding portion and the bottom surface protruding portion have protruding lengths different from each other in the direction parallel to the third direction or the fourth direction.

According to the embodiment, it is possible to further improve the adhesion between the insulating layer and the element body, by increasing protruding lengths of some of the protruding portions. In addition, by decreasing protruding length of some of the protruding portions, it is possible to reduce magnetic resistance of the magnetic path and improve the efficiency of obtaining inductance.

Preferably, in the embodiment of the inductor component, the inductor wiring is present in each of multiple layers along the first direction, and in the first section, a protruding length of the top surface protruding portion in the direction parallel to the third direction or the fourth direction is shorter for an inductor wiring located farther in the first direction.

According to the embodiment, since the protruding length of the top surface protruding portion is shorter for the inductor wiring located farther in the first direction, an area of the magnetic path of the coil is larger at a farther position in the first direction. Accordingly, when the second magnetic layer is filled in the second direction from a side of the first direction of the coil at the time of manufacturing, the filling of the second magnetic layer in the coil is facilitated, a filling rate is improved, and inductance can be improved.

Preferably, in the embodiment of the inductor component, the inductor wiring is present in each of multiple layers along the first direction, and in the first section, the top surface protruding portion is inclined in the second direction.

According to the embodiment, since the top surface protruding portion is inclined in the second direction, when the second magnetic layer is filled in the second direction from the first direction side of the coil at the time of manufacturing, the second magnetic layer is smoothly filled in the coil. In addition, due to the inclination in the second direction of the top surface protruding portion, it is possible to prevent the second magnetic layer from coming off in the first direction after the filling of the second magnetic layer, and to further improve the adhesion between the insulating layer and the element body.

Preferably, in the embodiment of the inductor component, in the first section, a protruding direction of the bottom surface protruding portion is parallel to the third direction or the fourth direction.

According to the embodiment, when the second magnetic layer is filled in the second direction from the first direction side of the coil at the time of manufacturing, since the filling is performed while a side of the first magnetic layer is stable, the magnetic layer can be more reliably filled in the magnetic path. Thus, the inductance can be increased.

Preferably, in the embodiment of the inductor component, in the first section, the bottom surface protruding portion is inclined in the first direction.

According to the embodiment, the adhesion between the insulating layer and the element body can be further improved.

Preferably, in the embodiment of the inductor component, the inductor wiring is present in each of multiple layers along the first direction. The multiple inductor wirings are connected in series and form one or more turns of the coil, and in the first section, each of the top surface protruding portion and the bottom surface protruding portion is located in an inner magnetic path or an outer magnetic path of the coil.

According to the embodiment, the adhesion between the insulating layer and the element body can be further improved.

Preferably, in the embodiment of the inductor component, the top surface protruding portion includes a protruding portion protruding in the third direction and a protruding portion protruding in the fourth direction, and the bottom surface protruding portion includes a protruding portion protruding in the third direction and a protruding portion protruding in the fourth direction.

According to the embodiment, the adhesion between the insulating layer and the element body can be further improved.

Preferably, in the embodiment of the inductor component, the top surface protruding portion includes a protruding portion protruding in the third direction and a protruding portion protruding in the fourth direction, and in the first section, a protruding length in the direction parallel to the third direction of the protruding portion protruding in the third direction is different from a protruding length in the direction parallel to the fourth direction of the protruding portion protruding in the fourth direction.

According to the embodiment, it is possible to further improve the adhesion between the insulating layer and the element body by increasing the length of one of the protruding portions. In addition, by decreasing the length of another of the protruding portions, it is possible to reduce magnetic resistance of the magnetic path and improve the efficiency of obtaining inductance.

Preferably, in the embodiment of the inductor component, the bottom surface protruding portion includes a protruding portion protruding in the third direction and a protruding portion protruding in the fourth direction, and in the first section, a protruding length in the direction parallel to the third direction of the protruding portion protruding in the third direction is different from a protruding length in the direction parallel to the fourth direction of the protruding portion protruding in the fourth direction.

According to the embodiment, it is possible to further improve the adhesion between the insulating layer and the element body by increasing the length of one of the protruding portions. In addition, by decreasing the length of the other of the protruding portions, it is possible to reduce magnetic resistance of the magnetic path and improve the efficiency of obtaining inductance.

Preferably, in the embodiment of the inductor component, in the first section, the top surface protruding portion is inclined in the first direction or the second direction.

According to the embodiment, the adhesion between the insulating layer and the element body can be further improved.

Preferably, in the embodiment of the inductor component, a thickness of the bottom surface portion of the insulating layer is less than a thickness of the top surface portion.

According to the embodiment, the inductance can be improved.

Preferably, in the embodiment of the inductor component, the inductor wiring is present in each of n (n: natural number, n≥2) layers along the first direction, and a material of an insulating layer covering an inductor wiring of a first layer is different from a material of an insulating layer covering an inductor wiring of an m-th (m: natural number, 2≤m≤n) layer.

According to the embodiment, a degree of freedom in design can be increased. For example, the material of the insulating layer covering the inductor wiring of the first layer is preferably selected with emphasis on peeling from a base substrate and stress. On the other hand, it is preferable that the material of the insulating layer covering the inductor wiring of the m-th layer be selected in view of laser or photolithography resolution, coverage of steps, and the like.

Preferably, in an embodiment of a method of manufacturing an inductor component includes the step of forming an inductor wiring having, in a first section orthogonal to an extending direction, a top surface facing a first direction, a bottom surface facing a second direction as a reverse direction of the first direction, a first side surface facing a third direction orthogonal to the first direction, and a second side surface facing a fourth direction as a reverse direction of the third direction. The method also includes the step of forming an insulating layer so as to have, in the first section, a top surface portion located farther in the first direction than the top surface, a bottom surface portion located farther in the second direction than the bottom surface, a first side surface portion in contact with the first side surface, a second side surface portion in contact with the second side surface, a top surface protruding portion provided at at least one of a position at which the top surface protruding portion protrudes from the top surface portion farther in the third direction than the first side surface portion and a position at which the top surface protruding portion protrudes from the top surface portion farther in the fourth direction than the second side surface portion, and a bottom surface protruding portion provided at at least one of a position at which the bottom surface protruding portion protrudes from the bottom surface portion farther in the third direction than the first side surface portion and a position at which the bottom surface protruding portion protrudes from the bottom surface portion farther in the fourth direction than the second side surface portion. The method further includes the step of forming an element body by stacking a first magnetic layer and a second magnetic layer along the first direction so as to sandwich the inductor wiring and the insulating layer. In the forming of the insulating layer, the bottom surface protruding portion is configured to be located between the first magnetic layer and the second magnetic layer, the first magnetic layer and the second magnetic layer are configured to be in contact with each other at a tip of the bottom surface protruding portion, and a protruding length of the bottom surface protruding portion in a direction parallel to the third direction or the fourth direction is configured to be greater than a protruding length of the top surface protruding portion in the direction parallel to the third direction or the fourth direction.

According to the embodiment, the adhesion between the insulating layer and the element body can be improved, and the inductor characteristics can also be improved.

Preferably, in the embodiment of the method of manufacturing an inductor component, in the forming of the inductor wiring, a dummy wiring is further formed at a position so as to overlap the top surface protruding portion as viewed in the first direction, after the forming the inductor wiring, removing the dummy wiring is further included. Also, in the forming the element body, the first magnetic layer or the second magnetic layer is further filled at a position where the dummy wiring is removed.

According to the embodiment, the magnetic layer in close contact with the top surface protruding portion can be manufactured at low cost.

According to an inductor component and a method of manufacturing an inductor component as an aspect of the present disclosure, it is possible to improve adhesion between an insulating layer and an element body, and also to improve inductor characteristics.

DETAILED DESCRIPTION

Hereinafter, an inductor component and a method of manufacturing an inductor component as an aspect of the present disclosure will be described in detail in embodiments illustrated in the figures. Note that, some of the figures are schematic and do not reflect actual dimensions and ratios in some cases.

First Embodiment

Configuration

Figure 1:
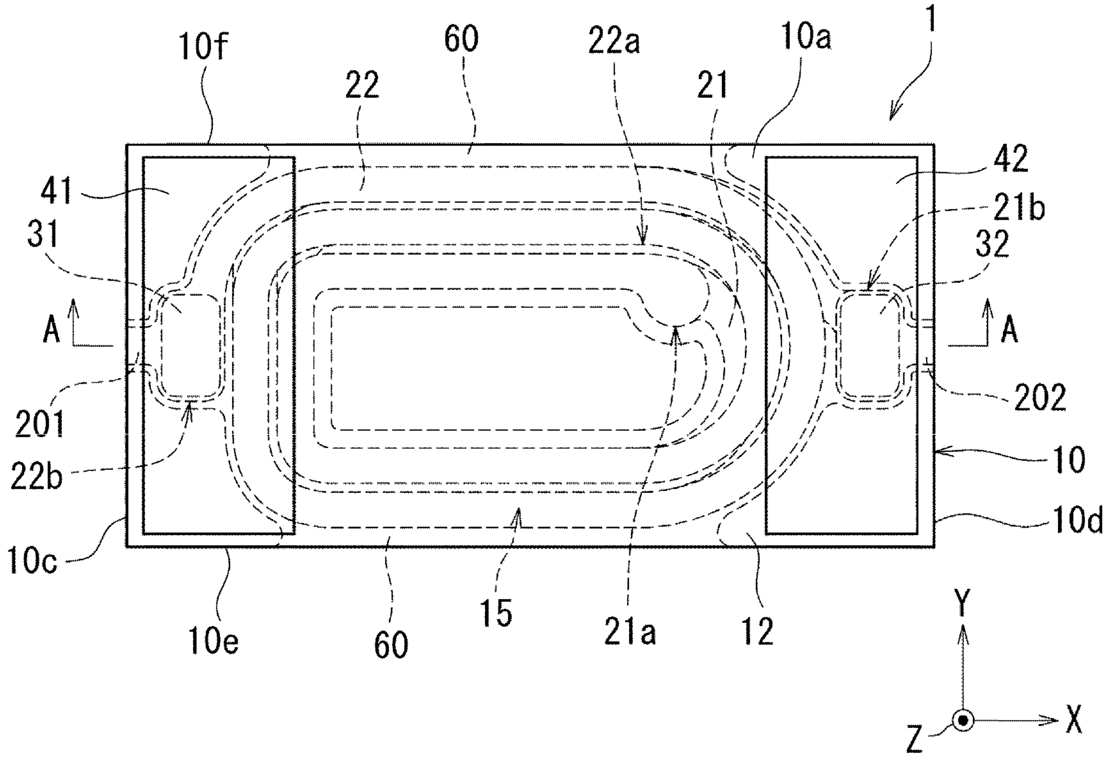
FIG. 1 is a plan view illustrating a first embodiment of an inductor component.
Figure 2:
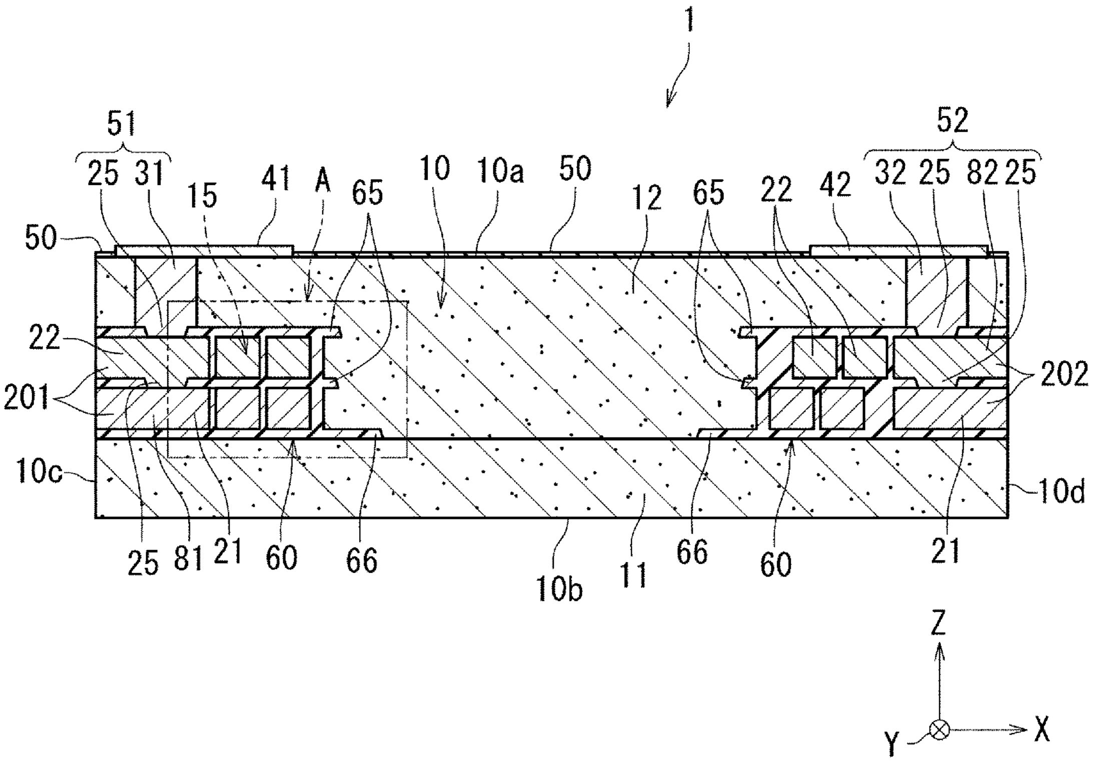
FIG. 2 is a sectional view taken along line A-A in FIG. 1.
Figure 3:
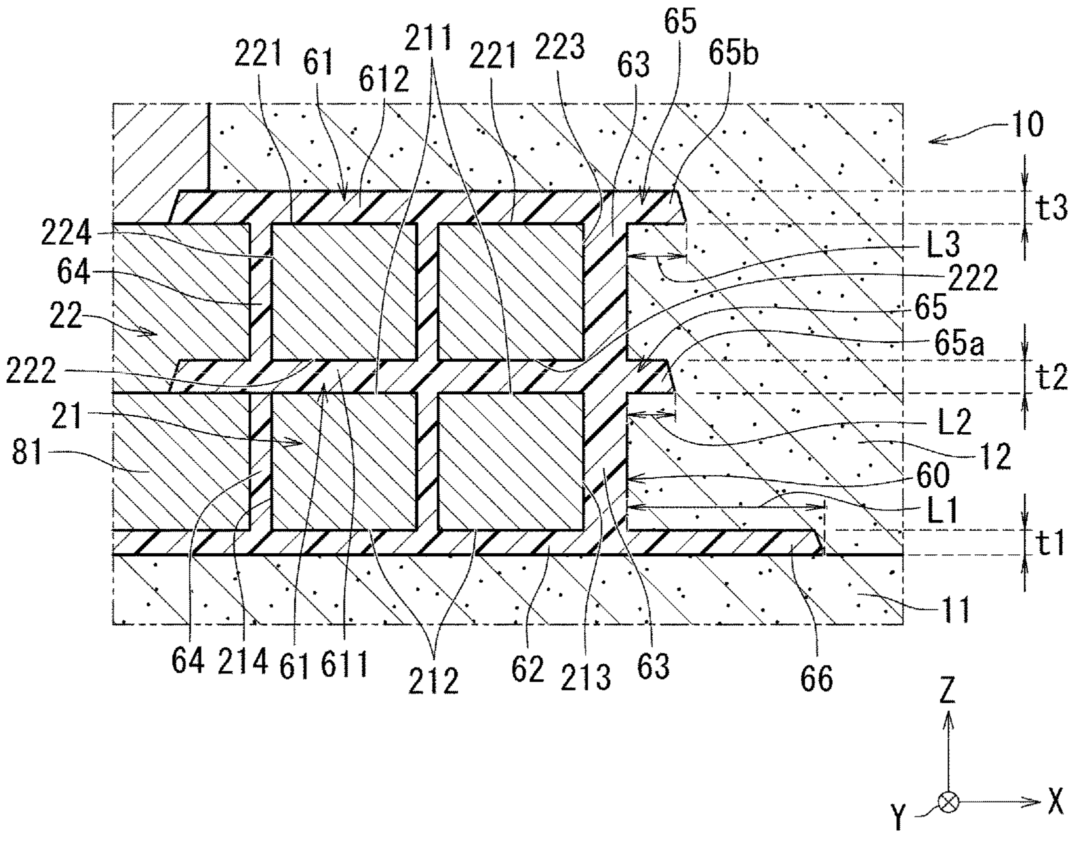
FIG. 3 is an enlarged view of a part A in FIG. 2.

FIG. 1 is a plan view illustrating a first embodiment of an inductor component. FIG. 2 is a sectional view taken along line A-A in FIG. 1. FIG. 3 is an enlarged view of a part A in FIG. 2.

An inductor component 1 is a component mounted on an electronic device such as a personal computer, a DVD player, a digital camera, a TV, a mobile phone, car electronics or the like and having, for example, a rectangular parallelepiped shape as a whole. However, the shape of the inductor component 1 is not particularly limited and the inductor component 1 may have a cylindrical shape, a polygonal columnar shape, a truncated cone shape, or a truncated polygonal cone shape.

As illustrated in FIG. 1 and FIG. 2, the inductor component 1 includes an element body 10, a coil 15 disposed in the element body 10, a non-magnetic insulating layer 60 covering at least part of the coil 15, a first vertical wiring 51 and a second vertical wiring 52 provided in the element body 10 so that end surfaces thereof are exposed at a first main surface 10*a* of the element body 10, a first external terminal 41 and a second external terminal 42 exposed at the first main surface 10*a* of the element body 10, and a coating film 50 provided on the first main surface 10*a* of the element body 10.

In the figures, a thickness direction of the inductor component 1 is defined as a Z direction, a forward Z direction indicates an upper side, and a reverse Z direction indicates a lower side. In a plane orthogonal to the Z direction of the inductor component 1, a length direction which is a longitudinal direction of the inductor component 1 and is a direction in which the first external terminal 41 and the second external terminal 42 are aligned is defined as an X direction, and a width direction of the inductor component 1 which is a direction orthogonal to the length direction is defined as a Y direction.

The element body 10 has the first main surface 10*a* and a second main surface 10*b*, and a first side surface 10*c*, a second side surface 10*d*, a third side surface 10*e*, and a fourth side surface 10*f* that are located between the first main surface 10*a* and the second main surface 10*b* and connect the first main surface 10*a* to the second main surface 10*b*.

The first main surface 10*a* and the second main surface 10*b* are disposed on mutually opposite sides in the Z direction, the first main surface 10*a* is disposed in the forward Z direction, and the second main surface 10*b* is disposed in the reverse Z direction. The first side surface 10*c* and the second side surface 10*d* are disposed on mutually opposite sides in the X direction, the first side surface 10*c* is disposed in a reverse X direction, and the second side surface 10*d* is disposed in a forward X direction. The third side surface 10*e* and the fourth side surface 10*f* are disposed on mutually opposite sides in the Y direction, the third side surface 10*e* is disposed in a reverse Y direction, and the fourth side surface 10*f* is disposed in a forward Y direction.

The element body 10 has a first magnetic layer 11 and a second magnetic layer 12 stacked in order along the forward Z direction. The term "in order" merely indicates a positional relationship between the first magnetic layer 11 and the second magnetic layer 12 and has no relation to an order of formation of the first magnetic layer 11 and the second magnetic layer 12.

Each of the first magnetic layer 11 and the second magnetic layer 12 includes magnetic powder and resin containing the magnetic powder. The resin is an organic insulating material made of, for example, an epoxy-based resin, a phenol-based resin, a liquid crystal polymer-based resin, a polyimide-based resin, or an acrylic-based resin, or a mixture thereof. The magnetic powder is, for example, an FeSi-based alloy such as FeSiCr, an FeCo-based alloy, an Fe-based alloy such as NiFe, or an amorphous alloy thereof. Accordingly, in comparison with a magnetic layer made of ferrite, it is possible to improve DC superposition characteristics by the magnetic powder and magnetic powder particles are insulated from each other by the resin, and thus a loss (iron loss) at a high frequency is reduced. Note that, the magnetic layer does not contain an organic resin in some cases and may be a sintered body of ferrite or magnetic powder or the like.

The coil 15 has a first inductor wiring 21 and a second inductor wiring 22. Each of the first inductor wiring 21 and the second inductor wiring 22 extends along a plane orthogonal to the Z direction between the first magnetic layer 11 and the second magnetic layer 12. Specifically, the first magnetic layer 11 is present in the reverse Z direction of the first inductor wiring 21 and the second inductor wiring 22, and the second magnetic layer 12 is present in the forward Z direction of the first inductor wiring 21 and the second inductor wiring 22 and in a direction orthogonal to the forward Z direction.

The first inductor wiring 21 is a wiring provided farther on a side of the reverse Z direction than the second inductor wiring 22 and extending in a spiral shape along the first main surface 10*a* of the element body 10. The number of turns of the first inductor wiring 21 preferably exceeds one. Thus, inductance can be improved. For example, the first inductor wiring 21 is wound in a helical shape in a clockwise direction from an inner peripheral end 21*a* toward an outer peripheral end 21*b* as viewed in the Z direction.

The second inductor wiring 22 is a wiring extending in a spiral shape along the first main surface 10*a* of the element body 10. The number of turns of the second inductor wiring 22 preferably exceeds one. Thus, the inductance can be improved. The second inductor wiring 22 is wound in a helical shape in the clockwise direction from an outer peripheral end 22*b* toward an inner peripheral end 22*a* as viewed in the Z direction. The second inductor wiring 22 is disposed between the first inductor wiring 21 and the second magnetic layer 12. Thus, each of the first inductor wiring 21 and the second inductor wiring 22 is disposed along the Z direction.

The outer peripheral end 21*b* of the first inductor wiring 21 is connected to the second external terminal 42 through the second vertical wiring 52 in contact with an upper surface of the outer peripheral end 21*b*. The outer peripheral end 22*b* of the second inductor wiring 22 is connected to the first external terminal 41 through the first vertical wiring 51 in contact with an upper surface of the outer peripheral end 22*b*. The inner peripheral end 22*a* of the second inductor wiring 22 is connected to the inner peripheral end 21*a* of the first inductor wiring 21 through a via wiring (not illustrated) in contact with a lower surface of the inner peripheral end 22*a*. With the configuration described above, the first inductor wiring 21 and the second inductor wiring 22 are connected to each other in series and electrically connected to the first external terminal 41 and the second external terminal 42.

Note that, in the present embodiment, a first connection wiring 81 is provided in the same layer as that of the first inductor wiring 21. The first connection wiring 81 is disposed below (the reverse Z direction side) the outer peripheral end 22*b* of the second inductor wiring 22 and is connected only to a lower surface of the second inductor wiring 22 through a via wiring 25. The first connection wiring 81 is not connected to the first inductor wiring 21 and is electrically independent. By providing the first connection wiring 81, the outer peripheral end 22*b* of the second inductor wiring 22 can be provided in the same layer as that of a winding portion of the second inductor wiring 22, and disconnection or the like can be suppressed.

A thickness of each of the first and second inductor wirings 21 and 22 is preferably equal to or greater than 40 μm and equal to or less than 120 μm (i.e., from 40 μm to 120

μm), for example. As an example of the first and second inductor wirings 21 and 22, a thickness is 30 μm and a wiring width is 45 μm.

Each of the first and second inductor wirings 21 and 22 is made of a conductive material, for example, made of a metal material having low electric resistance such as Cu, Ag, Au, Al or the like. Note that, the inductor wiring may have two-layer structure of a seed layer and an electrolytic plating layer and may contain Ti or Ni as the seed layer.

A first extended wiring 201 is connected to each of the outer peripheral end 22*b* of the second inductor wiring 22 and the first connection wiring 81, and the first extended wiring 201 is exposed at the first side surface 10*c*. A second extended wiring 202 is connected to each of the outer peripheral end 21*b* of the first inductor wiring 21 and the second vertical wiring 52 (to be specific, a second connection wiring 82 described later), and the second extended wiring 202 is exposed at the second side surface 10*d*.

The first extended wiring 201 and the second extended wiring 202 are wirings that are connected to a power supply wiring when electrolytic plating is additionally performed after shapes of the first and second inductor wirings 21 and 22 are formed in a manufacturing process of the inductor component 1. In a state of an inductor substrate before the inductor components 1 are separated from each other, additional electrolytic plating can be easily performed with the power supply wiring, and a distance between the wirings can be decreased. In addition, by performing the additional electrolytic plating to decrease the distance between the first and second inductor wirings 21 and 22, magnetic coupling between the first and second inductor wirings 21 and 22 can be enhanced. In addition, by providing the first extended wiring 201 and the second extended wiring 202, it is possible to ensure strength at the time of cutting the element body 10 when the inductor components 1 are separated from each other and to improve yield at the time of manufacturing.

The first vertical wiring 51 is made of a conductive material, extends in the Z direction from an upper surface of the second inductor wiring 22, and penetrates inside the second magnetic layer 12. The first vertical wiring 51 includes the via wiring 25 that is provided on the upper surface of the outer peripheral end 22*b* of the second inductor wiring 22 and penetrates inside the insulating layer 60, and a first columnar wiring 31 that extends in the forward Z direction from an upper surface of the via wiring 25, penetrates inside the second magnetic layer 12, and has an end surface exposed at the first main surface 10*a* of the element body 10. The via wiring 25 is a conductor having a line width (a diameter or a sectional area) less than that of the first columnar wiring 31.

The second vertical wiring 52 is made of a conductive material, extends in the Z direction from an upper surface of the first inductor wiring 21, and penetrates inside the insulating layer 60 and the second magnetic layer 12. The second vertical wiring 52 includes the via wiring 25 that is provided on the upper surface of the outer peripheral end 21*b* of the first inductor wiring 21 and penetrates inside the insulating layer 60, the second connection wiring 82 that extends from an upper surface of the via wiring 25 in the forward Z direction and penetrates inside the insulating layer 60, the via wiring 25 that is provided on an upper surface of the second connection wiring 82 and penetrates inside the insulating layer 60, and a second columnar wiring 32 that extends from an upper surface of the via wiring 25 in the forward Z direction, penetrates inside the second magnetic layer 12, and has an end surface exposed at the first main surface 10*a* of the element body 10. It is preferable that the first and second vertical wirings 51 and 52 be made of the same material as that of the first inductor wiring 21.

The first and the second external terminals 41 and 42 are provided on the first main surface 10*a* of the element body 10. Each of the first and second external terminals 41 and 42 is made of a conductive material and has, for example, three-layer structure in which Cu having low electric resistance and excellent stress resistance, Ni having excellent corrosion resistance, and Au having excellent solder wettability and reliability are aligned in this order from inside to outside. Thicknesses of the layers of Cu, Ni, and Au are, for example, 5 μm, 5 μm, and 0.01 μm, respectively.

The first external terminal 41 is in contact with an end surface, of the first vertical wiring 51, exposed at the first main surface 10*a* of the element body 10 and is electrically connected to the first vertical wiring 51. Thus, the first external terminal 41 is electrically connected to the outer peripheral end 22*b* of the second inductor wiring 22. The second external terminal 42 is in contact with an end surface, of the second vertical wiring 52, exposed at the first main surface 10*a* of the element body 10 and is electrically connected to the second vertical wiring 52. Thus, the second external terminal 42 is electrically connected to the outer peripheral end 21*b* of the first inductor wiring 21.

The insulating layer 60 is made of an insulating material that does not contain a magnetic substance. The insulating layer 60 is a thin film made of, for example, an organic resin such as an epoxy resin, a phenol resin, a polyimide resin, a liquid crystal polymer, or a combination thereof, a sintered body of glass, alumina, or the like, a silicon oxide film, a silicon nitride film, a silicon oxynitride film, or the like.

As illustrated in FIG. 3, in a first section orthogonal to an extending direction of the first inductor wiring 21, the first inductor wiring 21 has a top surface 211 facing the forward Z direction, a bottom surface 212 facing the reverse Z direction, a first side surface 213 facing the forward X direction, and a second side surface 214 facing the reverse X direction. In the first section, the second inductor wiring 22 has a top surface 221 facing the forward Z direction, a bottom surface 222 facing the reverse Z direction, a first side surface 223 facing the forward X direction, and a second side surface 224 facing the reverse X direction.

In FIG. 3, the forward Z direction corresponds to "a first direction" described in the claims, the reverse Z direction corresponds to "a second direction as a reverse direction of the first direction" described in the claims, the forward X direction corresponds to "a third direction orthogonal to the first direction" described in the claims, and the reverse X direction corresponds to "a fourth direction as a reverse direction of the third direction" described in the claims. In the present embodiment, the third direction indicates a radially inner side of the coil 15, and the fourth direction indicates a radially outer side of the coil 15. Hereinafter, description as "first to fourth directions" may be used.

When the inductor wiring forms more than one turn as in the present embodiment, multiple portions of the inductor wiring corresponding to respective turns may appear in the first section. In this case, a "top surface" refers to all top surfaces consisting of each of the top surfaces of the multiple portions. A "bottom surface" refers to all bottom surfaces consisting of each of the bottom surfaces of the multiple portions. A "first side surface" refers to a side surface, facing the third direction, of one of the multiple portions, the portion being located farthest on a side of the third direction. A "second side surface" refers to a side surface, facing the fourth direction, of one of the multiple portions, the portion being located farthest on a side of the fourth direction.

The insulating layer 60 has a first top surface portion 611 located farther in the first direction than the top surface 211 of the first inductor wiring 21, a bottom surface portion 62 located farther in the second direction than the bottom surface 212, a first side surface portion 63 in contact with the first side surface 213, a second side surface portion 64 in contact with the second side surface 214, a first top surface protruding portion 65*a* provided at at least one of a position at which the first top surface protruding portion 65*a* protrudes from the first top surface portion 611 farther in the third direction than the first side surface portion 63 and a position at which the first top surface protruding portion 65*a* protrudes from the first top surface portion 611 farther in the fourth direction than the second side surface portion 64, and a bottom surface protruding portion 66 provided at at least one of a position at which the bottom surface protruding portion 66 protrudes from the bottom surface portion 62 farther in the third direction than the first side surface portion 63 and a position at which the bottom surface protruding portion 66 protrudes from the bottom surface portion 62 farther in the fourth direction than the second side surface portion 64.

Further, the insulating layer 60 has a second top surface portion 612 located farther in the first direction than the top surface 221 of the second inductor wiring 22, a first side surface portion 63 in contact with the first side surface 223, a second side surface portion 64 in contact with the second side surface 224, and a second top surface protruding portion 65*b* provided at at least one of a position at which the second top surface protruding portion 65*b* protrudes from the second top surface portion 612 farther in the third direction than the first side surface portion 63 and a position at which the second top surface protruding portion 65*b* protrudes from the second top surface portion 612 farther in the fourth direction than the second side surface portion 64. Note that, when the multiple inductor wirings are stacked as in the present embodiment, the multiple top surface protruding portions may also be present along the Z direction. In this case, as described above, the top surface protruding portions are referred to as "a first top surface protruding portion", "a second top surface protruding portion", . . . , and "a P-th top surface protruding portion (P: a natural number equal to or greater than 2)" in order toward the forward Z direction with respect to the bottom surface protruding portion.

In the present embodiment, each of the first top surface protruding portion 65*a*, the second top surface protruding portion 65*b*, and the bottom surface protruding portion 66 is provided at corresponding one of positions at which the first top surface protruding portion 65*a*, the second top surface protruding portion 65*b*, and the bottom surface protruding portion 66 protrude farther in the third direction than the first side surface portion 63. The protruding direction of each of the first top surface protruding portion 65*a*, the second top surface protruding portion 65*b*, and the bottom surface protruding portion 66 is parallel to the third direction. The first top surface portion 611 is in contact with the top surface 211, the first side surface portion 63, and the second side surface portion 64. The second top surface portion 612 is in contact with the top surface 221, the first side surface portion 63, and the second side surface portion 64. The bottom surface portion 62 is in contact with the bottom surface 212, the first side surface portion 63, and the second side surface portion 64. To be specific, the first top surface protruding portion 65*a* protrudes in a direction parallel to the third direction from an end surface on the third direction side of the first top surface portion 611. The second top surface protruding portion 65*b* protrudes in the direction parallel to the third direction from an end surface on the third direction side of the second top surface portion 612. The bottom surface protruding portion 66 protrudes in the direction parallel to the third direction from an end surface on the third direction side of the bottom surface portion 62.

Here, when the multiple inductor wirings are stacked as in the present embodiment, the bottom surface portion refers to a portion of the insulating layer located farther in the second direction than the bottom surface of the inductor wiring of the first layer. In the present specification, a portion of the insulating layer located farther in the second direction than the bottom surface of the inductor wiring in a second or subsequent layer is not referred to as a bottom surface portion but is referred to as a top surface portion corresponding to an inductor wiring existing one layer below. Thus, in the present embodiment, a portion of the insulating layer 60 located farther in the second direction than the bottom surface 222 of the second inductor wiring 22 is not referred to as a bottom surface portion corresponding to the second inductor wiring 22 but is the first top surface portion 611 corresponding to the first inductor wiring 21.

The bottom surface protruding portion 66 is located between the first magnetic layer 11 and the second magnetic layer 12. The first magnetic layer 11 and the second magnetic layer 12 are in contact with each other at a tip of the bottom surface protruding portion 66. In other words, the bottom surface protruding portion 66 is located between the first magnetic layer 11 and the second magnetic layer 12, a lower surface on a side of the second direction is in contact with a contact surface of the first magnetic layer 11 with the second magnetic layer 12, and the tip is in contact with the second magnetic layer 12. A protruding length L1 in the direction parallel to the third direction of the bottom surface protruding portion 66 is greater than each of a protruding length L2 in the direction parallel to the third direction of the first top surface protruding portion 65*a*, and a protruding length L3 in the direction parallel to the third direction of the second top surface protruding portion 65*b*. The protruding length L1 is preferably equal to or greater than 10 μm and equal to or less than 100 μm (i.e., from 10 μm to 100 μm) and is, for example, 45 μm. Each of the protruding lengths L2 and L3 is preferably equal to or greater than 5 μm and equal to or less than 40 μm (i.e., from 5 μm to 40 μm) and is, for example, 25 μm.

According to the inductor component 1, the bottom surface protruding portion 66 is located between the first magnetic layer 11 and the second magnetic layer 12, and the protruding length L1 in the direction parallel to the third direction of the bottom surface protruding portion 66 is greater than each of the protruding length L2 in the direction parallel to the third direction of the first top surface protruding portion 65*a* and the protruding length L3 in the direction parallel to the third direction of the second top surface protruding portion 65*b*. Thus, adhesion between the first magnetic layer 11 and the second magnetic layer 12 can be ensured with the bottom surface protruding portion 66 interposed therebetween. In addition, a contact area between the insulating layer 60 and the element body 10 is increased due to the first top surface protruding portion 65*a* and the second top surface protruding portion 65*b*, and adhesion between the insulating layer 60 and the element body 10 is improved by the first top surface protruding portion 65*a* and the second top surface protruding portion 65*b* biting into the element body 10. As described above, the adhesion between the insulating layer 60 and the element body 10 can be improved.

Furthermore, according to the inductor component 1, the first magnetic layer 11 and the second magnetic layer 12 are in contact with each other at the tip of the bottom surface protruding portion 66. Thus, volume of the second magnetic layer 12 can be increased, as compared with a case where the bottom surface protruding portion 66 extends toward a center of the coil 15 and covers an entire region of an inner magnetic path of the coil 15. As a result, efficiency of obtaining inductance can be improved. As described above, according to the inductor component 1, the adhesion between the insulating layer 60 and the element body 10 can be improved, and inductor characteristics can also be improved.

Preferably, the inductor wiring is present in each of multiple layers along the first direction, the multiple inductor wirings are connected in series and form one or more turns of the coil 15, and the third direction is an inner surface direction of the coil 15.

According to the above-described configuration, since the bottom surface protruding portion 66 protrudes into the inner magnetic path in which a contact area between the first magnetic layer 11 and the second magnetic layer 12 is relatively large, it is possible to improve the adhesion between the insulating layer 60 and the element body 10.

Preferably, three or more of the top surface protruding portions 65 and the bottom surface protruding portion 66 are present in the first section, and in the first section, at least three of the top surface protruding portions 65 and the bottom surface protruding portion 66 have protruding lengths different from each other in the direction parallel to the third direction or the fourth direction. For example, in the first section illustrated in FIG. 2, there are six top surface protruding portions 65 and bottom surface protruding portions 66 in total, that is, the first top surface protruding portion 65*a* located on a side of the reverse X direction, the second top surface protruding portion 65*b* located on the reverse X direction side, the bottom surface protruding portion 66 located on the reverse X direction side, the first top surface protruding portion 65*a* located on a side of the forward X direction, the second top surface protruding portion 65*b* located on the forward X direction side, and the bottom surface protruding portion 66 located on the forward X direction side.

According to the above-described configuration, it is possible to further improve the adhesion between the insulating layer 60 and the element body 10 by increasing protruding lengths of some of the top surface protruding portions 65 and bottom surface protruding portions 66. In addition, by decreasing protruding length of some of the top surface protruding portions 65 and bottom surface protruding portions 66, it is possible to reduce magnetic resistance of the magnetic path and improve the efficiency of obtaining inductance.

Preferably, in the first section, the protruding direction of the bottom surface protruding portion 66 is parallel to the third direction or the fourth direction.

According to the above-described configuration, when the second magnetic layer 12 is filled in the second direction from a side of the first direction of the coil 15 at the time of manufacturing, since the filling is performed while a side of the first magnetic layer 11 is stable, the magnetic layer can be more reliably filled in the magnetic path. Thus, the inductance can be increased.

Preferably, the inductor wiring is present in each of multiple layers along the first direction, the multiple inductor wirings are connected in series and form one or more turns of the coil 15, and in the first section, each of the top surface protruding portions 65 and the bottom surface protruding portion 66 is located in the inner magnetic path or an outer magnetic path of the coil 15.

According to the above-described configuration, it is possible to further improve the adhesion between the insulating layer 60 and the element body 10.

Preferably, as illustrated in FIG. 3, a thickness t1 of the bottom surface portion 62 of the insulating layer 60 is less than each of a thickness t2 of the first top surface portion 611 and a thickness t3 of the second top surface portion 612.

According to the above-described configuration, the inductance can be improved. Note that, since an interlayer insulating layer is affected by unevenness of an inductor wiring in a lower layer, a thickness thereof needs to be relatively increased. On the other hand, it is easy to relatively decrease a thickness of the bottom surface portion 62 serving as a lowermost layer of the insulating layer 60 by polishing or the like. In addition, at the time of manufacturing the inductor component 1, by forming the insulating layer 60 on a flat base substrate, it is further easy to decrease the thickness of the bottom surface portion 62 serving as the lowermost layer of the insulating layer 60.

The inductor wiring is present in each of n (n: natural number, n≥2) layers along the first direction, and a material of an insulating layer covering an inductor wiring of the first layer is different from a material of an insulating layer covering an inductor wiring of an m-th (m: natural number, 2≤m≤n) layer.

Here, "the insulating layer covering the inductor wiring of the first layer" includes not only an insulating layer located on each of a top surface side, a first side surface side, and a second side surface side of the inductor wiring of the first layer but also an insulating layer located on a bottom surface side. According to the above-described configuration, it is possible to increase a degree of freedom in design. For example, the material of the insulating layer covering the inductor wiring of the first layer is preferably selected with emphasis on peeling from a base substrate and stress. On the other hand, it is preferable that the material of the insulating layer covering the inductor wiring of the m-th layer be selected in view of laser or photolithography resolution, coverage of steps, and the like. Specifically, for example, non-photosensitive polyimide may be used as a material of the insulating layer (bottom surface portion) under the inductor wiring of the first layer, and photosensitive polyimide may be used as a material of the insulating layer of the inductor wiring of the m-th layer. As described above, even resins having the same types are regarded as different when additives or polymer materials are different. Further, the material of the insulating layer covering the inductor wiring of the first layer may be polyimide, and the material of the insulating layer of the inductor wiring of the m-th layer may be a combination with a filler-containing epoxy resin excellent in laser processability and insulating properties.

In the first embodiment, the inductor wirings are in the two layers but may be in three or more layers. With three or more layers, the number of turns of the inductor wiring can be increased, so that the inductance can be increased.

Here, for example, when the number of inductor wirings is increased, it is sufficient that the inductor wirings are stacked up to the m-th layer (m is a natural number equal to or greater than 3) in order from the first layer, a second layer. At this time, the first direction (a stacking direction) can be determined based on a wiring shape or the like. For example, the inductor wiring generally has a flat bottom surface and a curved top surface due to a manufacturing process thereof. Thus, since subsequent layers are sequentially stacked on a side of the curved surface of the inductor wiring, it can be said that the first direction is a direction from a side of the flat surface toward the side of the curved surface of the inductor wiring. For example, a diameter of a via wiring connecting inductor wirings to each other on a top surface side is greater than that on a bottom surface side due to a manufacturing process thereof. Thus, since stacking is performed on the side where the diameter of the via wiring is greater, it can be said that the first direction is a direction from a connection surface on a side where the diameter of the via wiring is smaller toward a connection surface on a side where the diameter is greater. For example, when an inductor wiring is formed using a seed layer, it can be said that the first direction is a direction from a side where the seed layer is present toward a side where the seed layer is not present. Note that, the above-described method of determining the first direction can also be applied to a case of one layer.

In the first embodiment, as illustrated in FIG. 2, the top surface protruding portion 65 and the bottom surface protruding portion 66 protrude into the inner magnetic path of the coil 15 but preferably also protrude into the outer magnetic path of the coil 15. Specifically, when the first section is, for example, a YZ plane including an axis of the coil 15, the insulating layer 60 preferably further includes, in the first section, a first top surface protruding portion provided at a position at which the first top surface protruding portion protrudes from the first top surface portion farther in the fourth direction than the second side surface portion, a second top surface protruding portion provided at a position at which the second top surface protruding portion protrudes from the second top surface portion farther in the fourth direction than the second side surface portion, and a bottom surface protruding portion provided at a position at which the bottom surface protruding portion protrudes from the bottom surface portion farther in the fourth direction than the second side surface portion. According to the above-described configuration, since the top surface protruding portion 65 and the bottom surface protruding portion 66 also protrude into the outer magnetic path, the adhesion between the insulating layer 60 and the element body 10 is further improved.

Method of Manufacturing

Figure 4A:
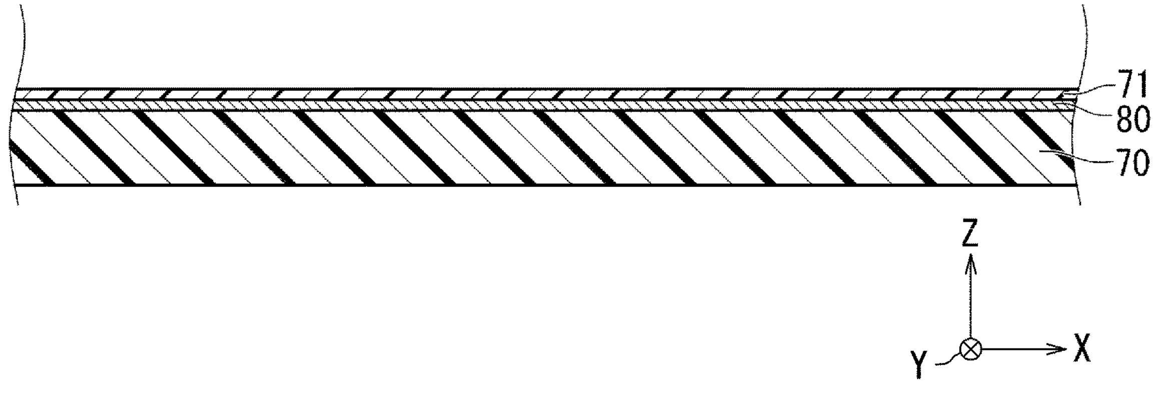
FIG. 4A is an explanatory view for explaining a method of manufacturing the inductor component.

Next, a method of manufacturing the inductor component 1 will be described. FIG. 4A to FIG. 4N correspond to the sectional view taken along line A-A in FIG. 1 (FIG. 2).

As illustrated in FIG. 4A, a base substrate 70 is prepared. The base substrate 70 is made of an inorganic material such as ceramic, glass, silicon or the like, for example. Copper foil 80 is provided on a main surface of the base substrate 70, a first insulating layer 71 is additionally applied on the copper foil 80, and the first insulating layer 71 is cured.

Figure 4B:
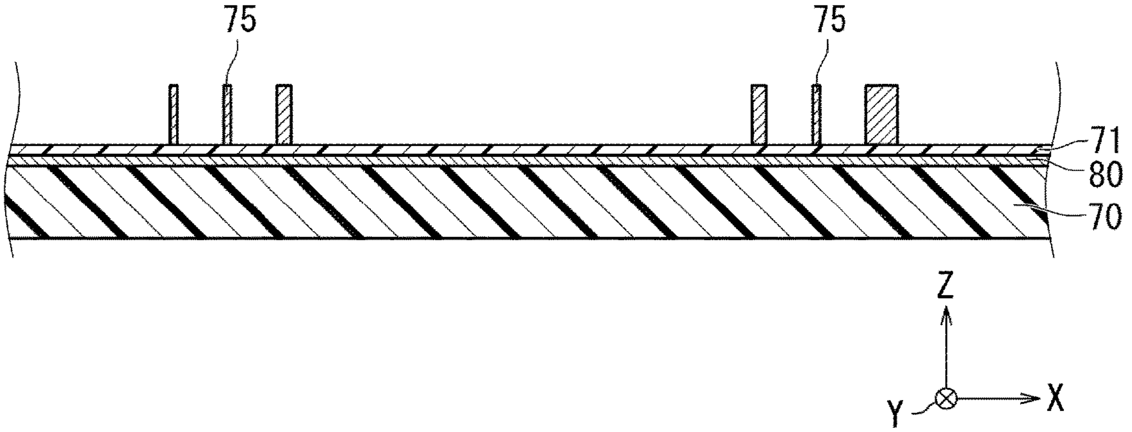
FIG. 4B is an explanatory view for explaining the method of manufacturing the inductor component.

As illustrated in FIG. 4B, a seed layer (Ti/Cu) (not illustrated) is formed on the first insulating layer 71 by a known method such as a sputtering method, a vapor deposition method or the like. Thereafter, a DFR (dry film resist) 75 is attached, and a predetermined pattern is formed on the DFR 75 by using a photolithography method.

Figure 4C:
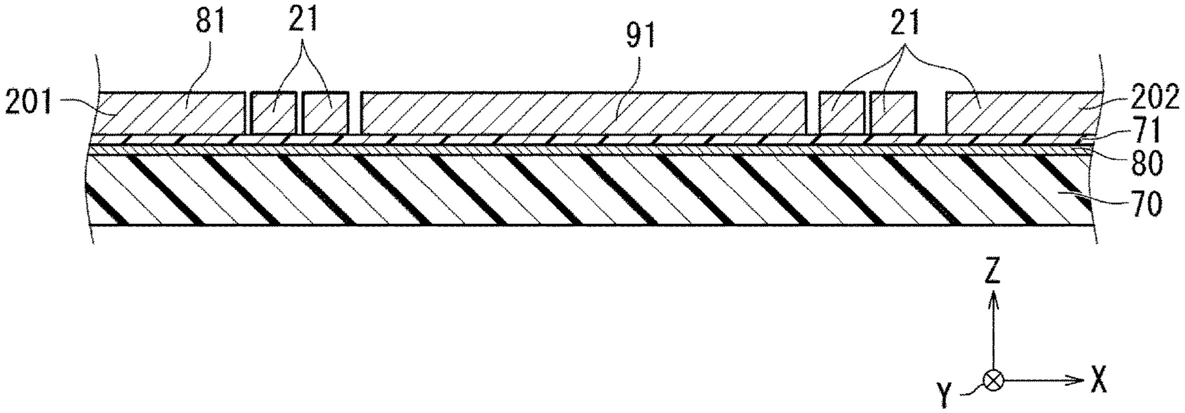
FIG. 4C is an explanatory view for explaining the method of manufacturing the inductor component.

As illustrated in FIG. 4C, the first inductor wiring 21, the first connection wiring 81, and a first dummy wiring 91 are formed on the first insulating layer 71 by using an electrolytic plating method, while supplying power to the seed layer. Thereafter, the DFR 75 is peeled off and the seed layer is etched. Thus, gaps are provided among the first inductor wiring 21, the first connection wiring 81, and the first dummy wiring 91.

Figure 4D:
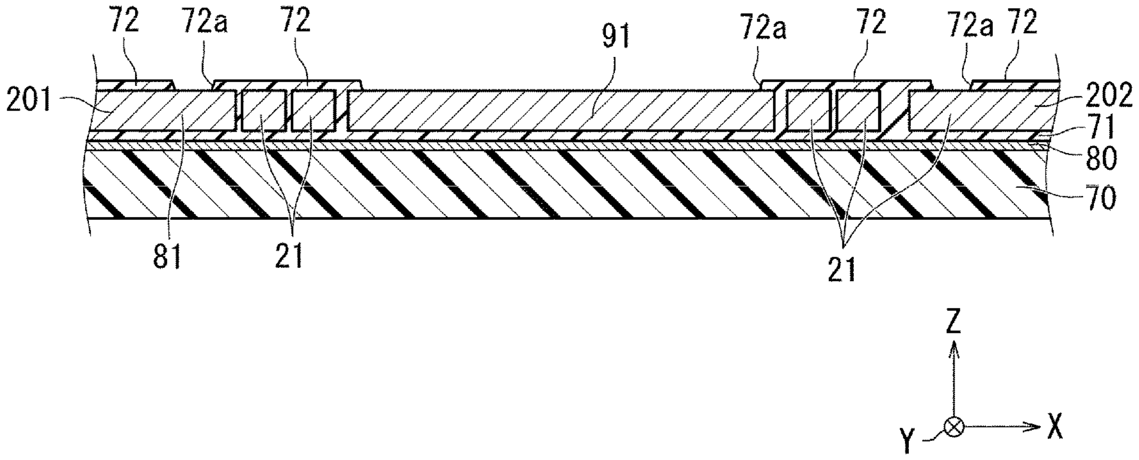
FIG. 4D is an explanatory view for explaining the method of manufacturing the inductor component.

As illustrated in FIG. 4D, the second insulating layer 72 is applied and cured on the first inductor wiring 21, the first connection wiring 81, and the first dummy wiring 91. At this time, the gaps are also filled with the second insulating layer 72. Thereafter, the second insulating layer 72 is irradiated with laser to form openings 72*a* such that the first dummy wiring 91, part of an upper surface of the first connection wiring 81 to which the via wiring 25 is connected, and part of an upper surface of the first inductor wiring 21 to which the via wiring 25 is connected are exposed. At this time, part of the second insulating layer 72 is configured to overlap the first dummy wiring 91. The overlapping part of the second insulating layer 72 corresponds to the first top surface protruding portion. Here, a central part of the second insulating layer 72 on the first dummy wiring 91 need not be removed, and for example, an annular opening may be formed by irradiating with laser along an outer periphery of the first dummy wiring 91. Accordingly, laser irradiation time can be shortened. Note that, the central part of the second insulating layer 72 on the first dummy wiring 91 can be removed by being lifted off when the first dummy wiring 91 is removed.

Figure 4E:
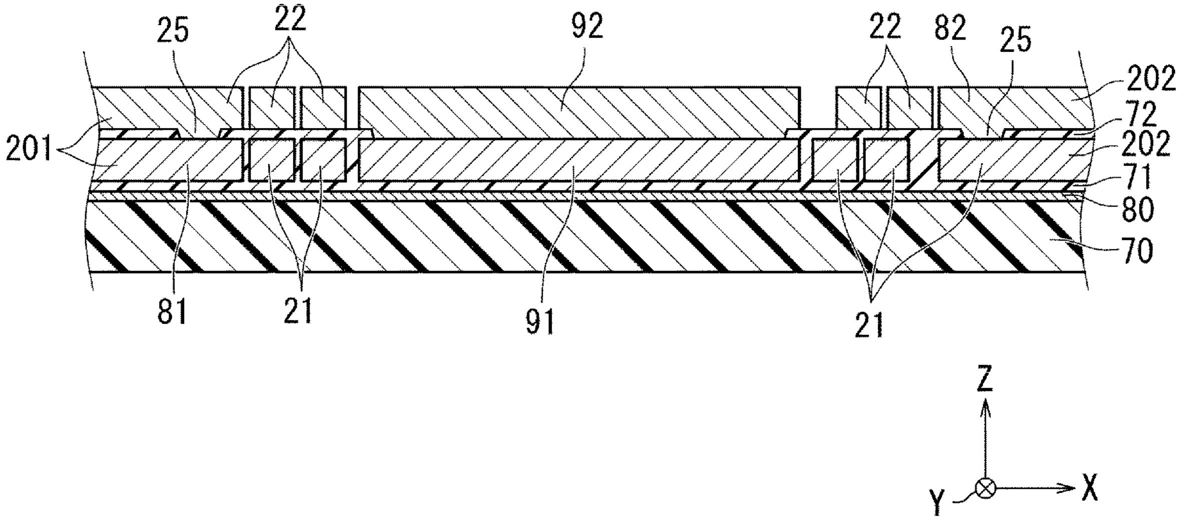
FIG. 4E is an explanatory view for explaining the method of manufacturing the inductor component.

As illustrated in FIG. 4E, a seed layer (Ti/Cu) (not illustrated) is formed on the second insulating layer 72 by a known method such as a sputtering method, a vapor deposition method or the like. Thereafter, the DFR (dry film resist) 75 is attached, and a predetermined pattern is formed on the DFR 75 by using a photolithography method. The via wiring 25, the second inductor wiring 22, the second connection wiring 82, and a second dummy wiring 92 are formed in the opening 72*a* and on the second insulating layer 72, by using an electrolytic plating method, while supplying power to the seed layer. Thereafter, the DFR 75 is peeled off and the seed layer is etched. Thus, gaps are provided among the second inductor wiring 22, the second connection wiring 82, and the second dummy wiring 92.

Figure 4F:
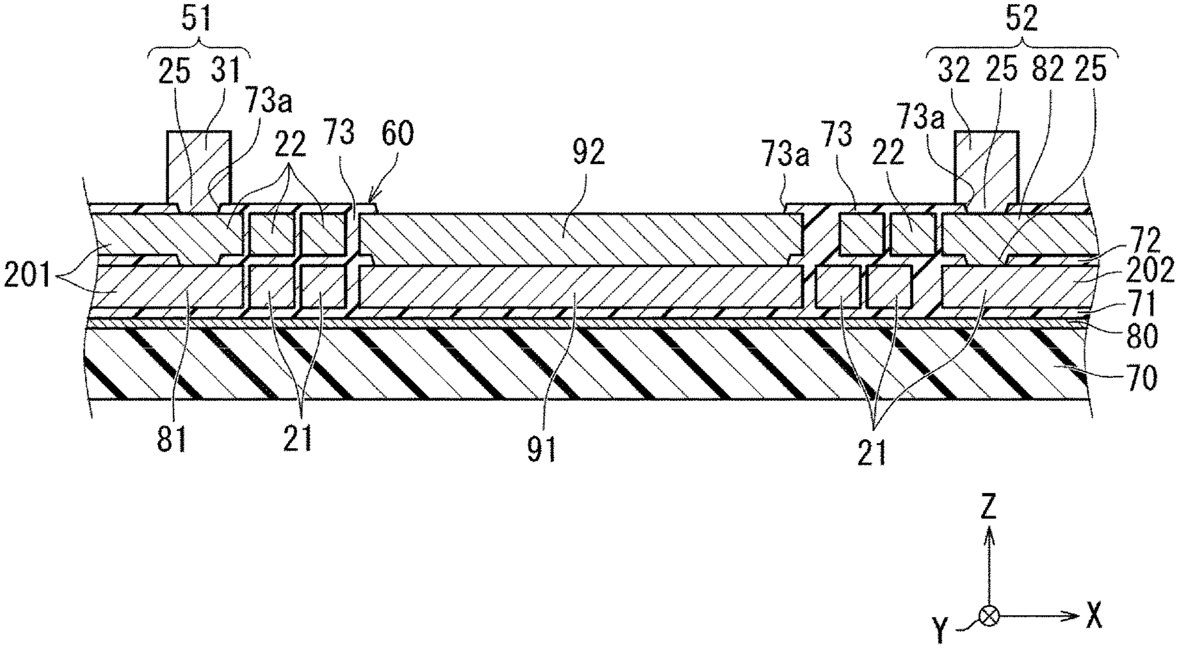
FIG. 4F is an explanatory view for explaining the method of manufacturing the inductor component.

As illustrated in FIG. 4F, a third insulating layer 73 is applied and cured on the second inductor wiring 22, the second connection wiring 82, and the second dummy wiring 92. At this time, the gaps are also filled with the third insulating layer 73. Thereafter, the third insulating layer 73 is irradiated with laser to form openings 73*a* such that the second dummy wiring 92, part of an upper surface of the second connection wiring 82 to which the via wiring 25 is connected, and part of the upper surface of the second inductor wiring 22 to which the via wiring 25 is connected are exposed. At this time, part of the third insulating layer 73 is configured to overlap the second dummy wiring 92. The overlapping part of the third insulating layer 73 corresponds to the second top surface protruding portion. Then, a seed layer is formed on the third insulating layer 73. A DFR is attached again, and a predetermined pattern is formed on the DFR by using a photolithography method. The predetermined pattern includes through-holes corresponding to a position where the first columnar wiring 31 is provided on the second inductor wiring 22, and a position where the second columnar wiring 32 is provided on the second connection wiring 82. By using electrolytic plating, the via wiring 25 and the first columnar wiring 31 are formed on the second inductor wiring 22, and the via wiring 25 and the second columnar wiring 32 are formed on the second connection wiring 82. Thereafter, the DFR is peeled off and the seed layer is etched.

Figure 4G:
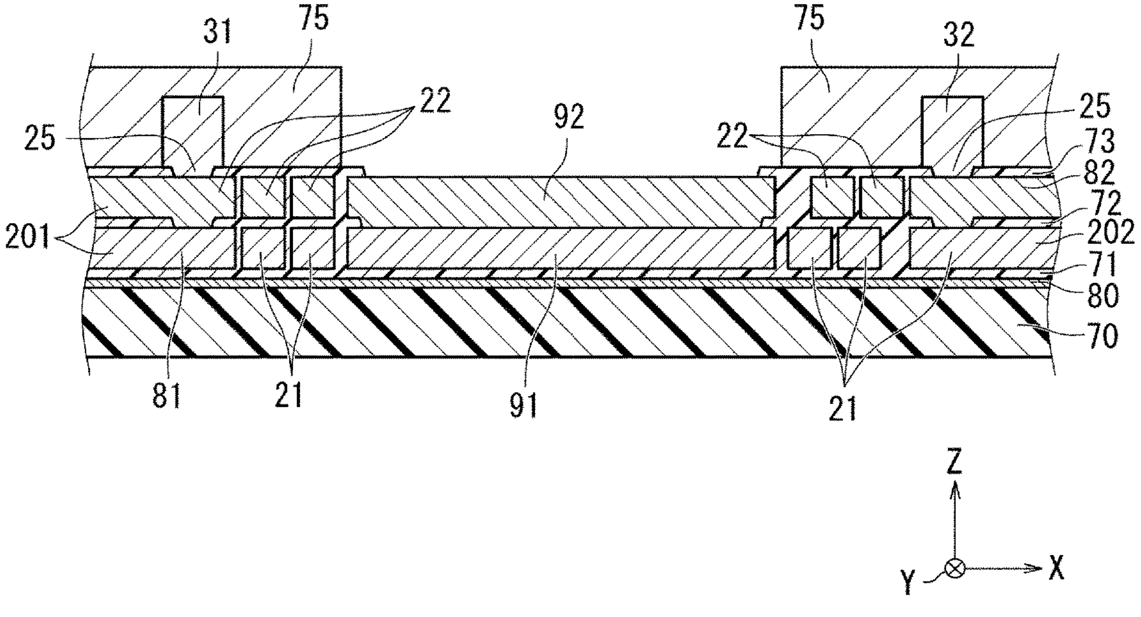
FIG. 4G is an explanatory view for explaining the method of manufacturing the inductor component.

As illustrated in FIG. 4G, the DFR 75 is provided so as to protect the first columnar wiring 31 and the second columnar wiring 32.

Figure 4H:
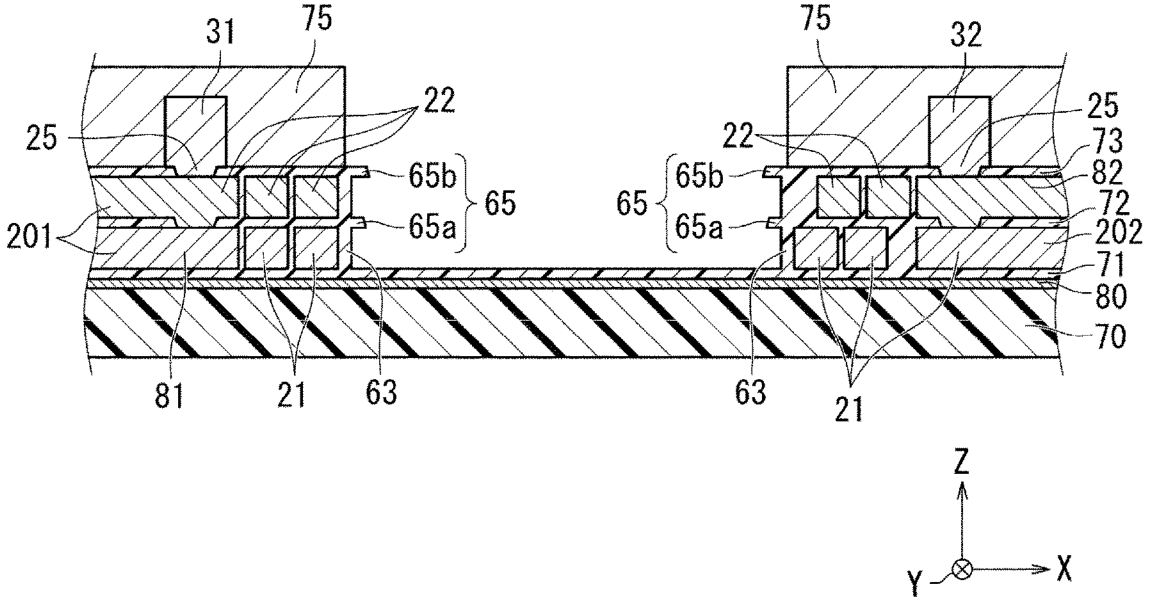
FIG. 4H is an explanatory view for explaining the method of manufacturing the inductor component.

As illustrated in FIG. 4H, the first dummy wiring 91 and the second dummy wiring 92 are etched. Thus, the first top surface protruding portion 65*a*, the second top surface protruding portion 65*b*, and the first side surface portion 63 of the insulating layer 60 are formed.

Figure 4I:
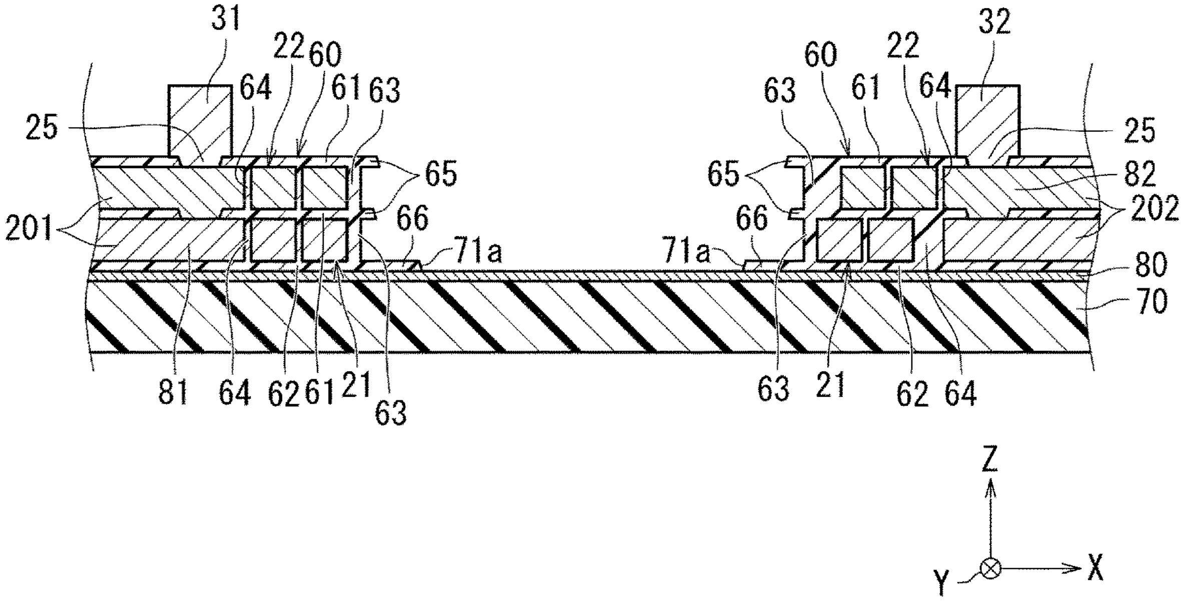
FIG. 4I is an explanatory view for explaining the method of manufacturing the inductor component.

As illustrated in FIG. 4I, the DFR 75 is peeled off, and part of the first insulating layer 71 is irradiated with laser to form an opening 71*a*. Thus, the bottom surface protruding portion 66 of the insulating layer 60 is formed. At this time, the copper foil 80 is used as a laser stop layer. Note that, instead of providing the copper foil 80, an opening may be formed in the first insulating layer 71 with laser for each part of the base substrate, or the first insulating layer 71 may be patterned with a patterning process such as laser, photolithography or the like from the beginning.

Figure 4J:
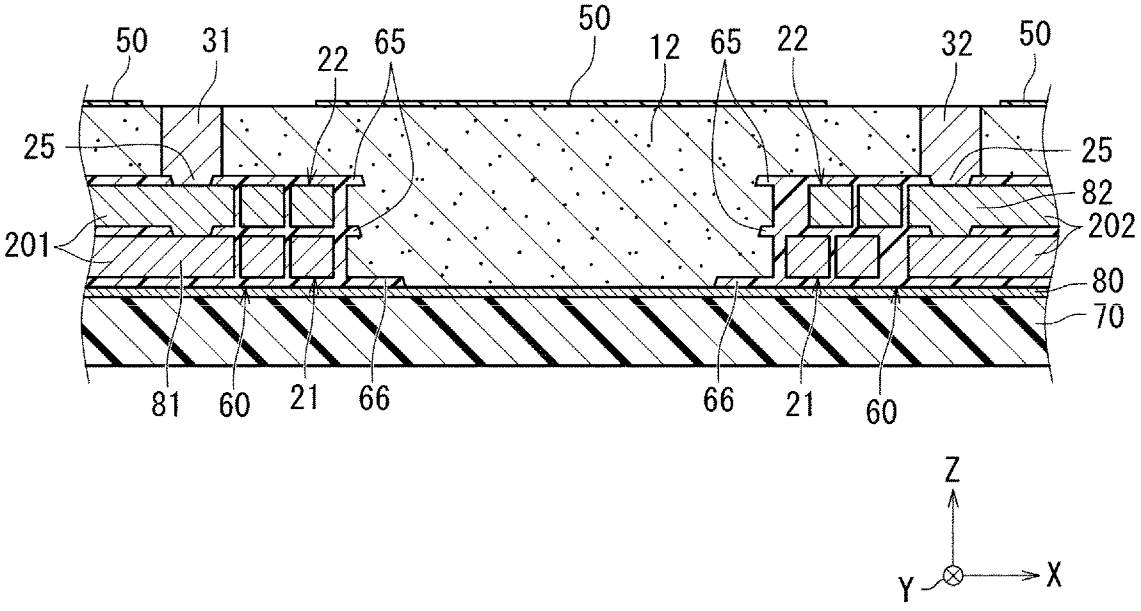
FIG. 4J is an explanatory view for explaining the method of manufacturing the inductor component.

As illustrated in FIG. 4J, a magnetic sheet to be the second magnetic layer 12 is pressure-bonded from above the main surface of the base substrate 70 toward the first inductor wiring 21 and the second inductor wiring 22, to cover the first inductor wiring 21, the second inductor wiring 22, the first columnar wiring 31, and the second columnar wiring 32 with the second magnetic layer 12. Thereafter, an upper surface of the second magnetic layer 12 is ground, and an end surface of each of the first columnar wiring 31 and the second columnar wiring 32 is exposed at the upper surface of the second magnetic layer 12. Thereafter, an insulating layer to be the coating film 50 is applied on the upper surface of the second magnetic layer 12. Then, the insulating layer is formed into a predetermined pattern by using a photolithography method and cured. The predetermined pattern is a pattern with which the coating film 50 can cover a region of the upper surface of the second magnetic layer 12 excluding regions in which the first and second external terminals 41 and 42 are formed.

Figure 4K:
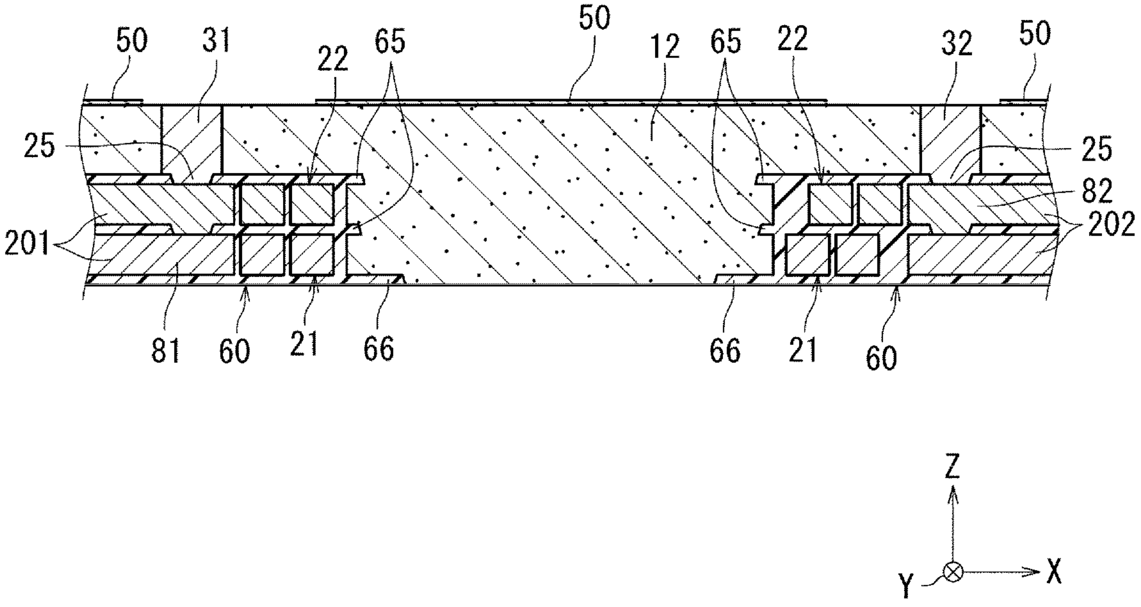
FIG. 4K is an explanatory view for explaining the method of manufacturing the inductor component.
Figure 4L:
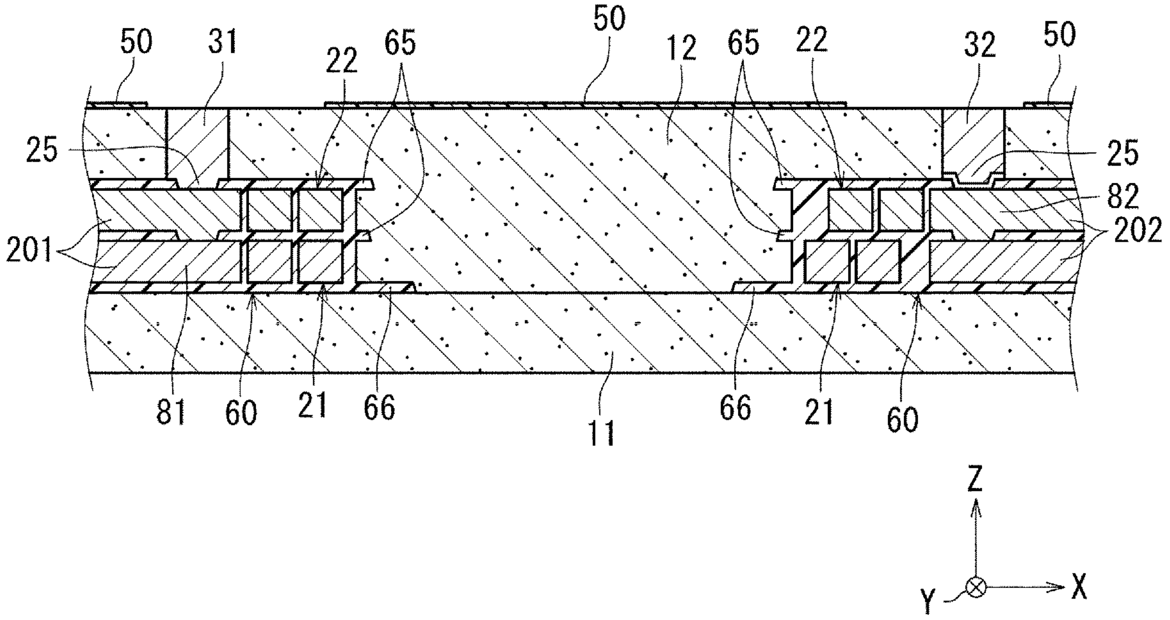
FIG. 4L is an explanatory view for explaining the method of manufacturing the inductor component.

As illustrated in FIG. 4K, the base substrate 70 and the copper foil 80 are removed by polishing. At this time, part of the first insulating layer 71 may also be removed.

As illustrated in 4L, another magnetic sheet to be the first magnetic layer 11 is pressure-bonded from below the first inductor wiring 21 toward the first inductor wiring 21 and the second inductor wiring 22 to cover the first inductor wiring 21 and the second inductor wiring 22 with the first magnetic layer 11. Thereafter, the first magnetic layer 11 is ground to have a predetermined thickness.

Figure 4M:
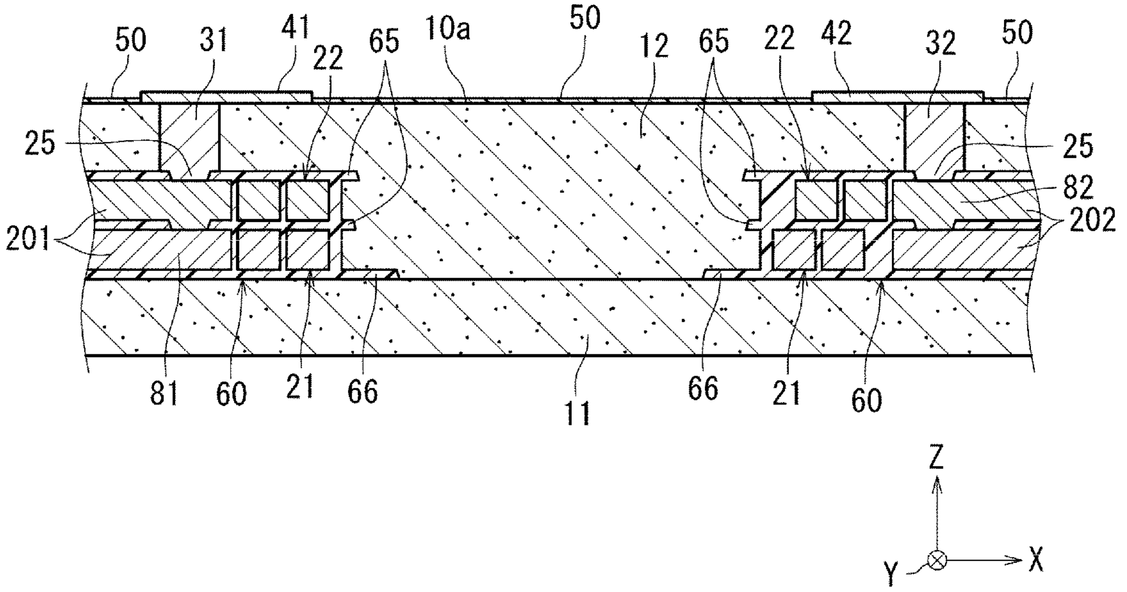
FIG. 4M is an explanatory view for explaining the method of manufacturing the inductor component.
Figure 4N:
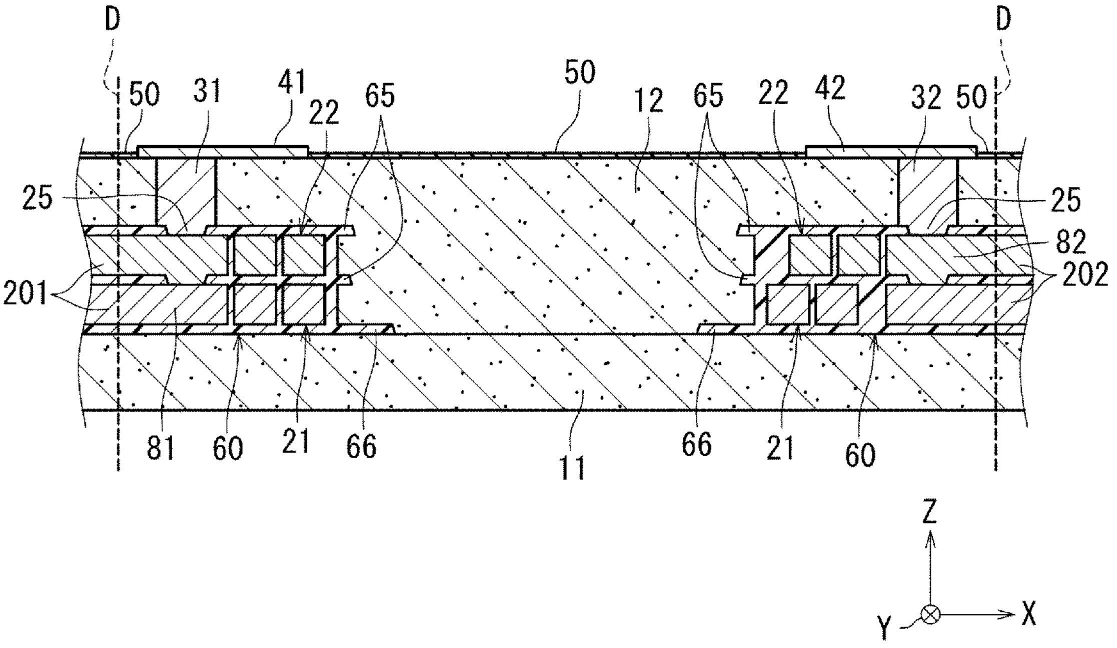
FIG. 4N is an explanatory view for explaining the method of manufacturing the inductor component.

As illustrated in FIG. 4M, the first and second external terminals 41 and 42 are formed by electroless plating so as to cover an end surface of the first columnar wiring 31 and an end surface of the second columnar wiring 32 exposed at the first main surface 10*a*, respectively. Each of the first and second external terminals 41 and 42 is, for example, formed by stacking Cu, Ni, and Au in order from a side of the first main surface 10*a*. Note that, a catalyst such as Pd (not illustrated) may be applied to part where the first external terminal 41 is in contact with an upper surface of the element body 10 and the end surface of the first columnar wiring 31, and part where the second external terminal 42 is in contact with the upper surface of the element body 10 and the end surface of the second columnar wiring 32, before forming the first and second external terminals 41 and 42.

As illustrated in FIG. 4N, the inductor components 1 are separated from each other along cut lines D. As described above, the inductor component 1 is manufactured.

As described above, the method of manufacturing the inductor component includes the steps of forming the first inductor wiring 21 and the second inductor wiring 22, forming the insulating layer 60, and forming the element body 10.

In the forming the first inductor wiring 21 and the second inductor wiring 22, the first inductor wiring 21 and the second inductor wiring 22, each having the top surface, the bottom surface, the first side surface, and the second side surface in the first section orthogonal to the extending direction, are formed.

In the forming the insulating layer 60, the insulating layer 60 is formed so as to have, in the first section, the first top surface portion 611, the second top surface portion 612, the bottom surface portion 62, the first side surface portion 63, the second side surface portion 64, the first top surface protruding portion 65*a*, the second top surface protruding portion 65*b*, and the bottom surface protruding portion 66.

In the forming the element body 10, the element body 10 is formed by stacking the first magnetic layer 11 and the second magnetic layer 12 along the first direction so as to sandwich the first inductor wiring 21 and the second inductor wiring 22.

Further, in the forming the insulating layer 60, the bottom surface protruding portion 66 is configured to be located between the first magnetic layer 11 and the second magnetic layer 12, the first magnetic layer 11 and the second magnetic layer 12 are configured to be in contact with each other at the tip of the bottom surface protruding portion 66, and the protruding length in the direction parallel to the third direction or the fourth direction of the bottom surface protruding portion 66 is configured to be greater than each of the protruding length in the direction parallel to the third direction or the fourth direction of the first top surface protruding portion 65*a*, and the protruding length in the direction parallel to the third direction or the fourth direction of the second top surface protruding portion 65*b*.

According to the above-described configuration, the adhesion between the insulating layer 60 and the element body 10 can be improved, and the inductor characteristics can also be improved.

Preferably, in the forming the first inductor wiring 21 and the second inductor wiring 22, additionally, the first dummy wiring 91 is formed at a position so as to overlap the first top surface protruding portion 65*a* and the second dummy wiring 92 is formed at a position so as to overlap the second top surface protruding portion 65*b* as viewed in the first direction. Removing the first dummy wiring 91 and the second dummy wiring 92 is further provided, after the forming the first inductor wiring 21 and the second inductor wiring 22. In the forming the element body 10, additionally, the second magnetic layer 12 is filled at a position where the first dummy wiring 91 and the second dummy wiring 92 are removed. Note that, instead of the second magnetic layer 12, the first magnetic layer 11 may be filled.

According to the above-described configuration, the magnetic layer that is in close contact with the first top surface protruding portion 65*a* and the second top surface protruding portion 65*b* can be manufactured at low cost.

Second Embodiment

Figure 5:
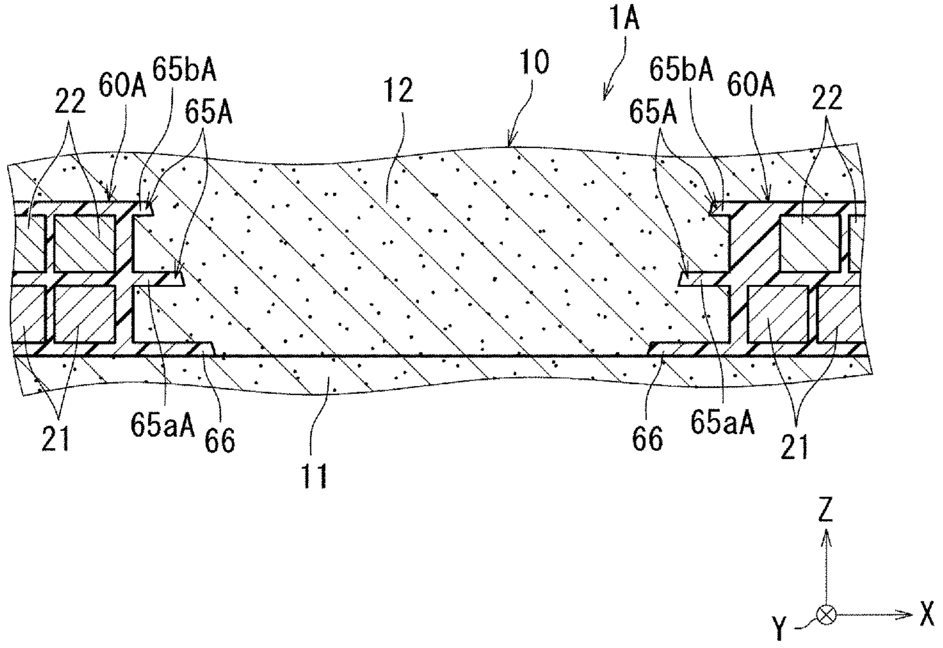
FIG. 5 is a sectional view illustrating a second embodiment of the inductor component.

FIG. 5 is a sectional view illustrating a second embodiment of the inductor component. FIG. 5 is a sectional view corresponding to FIG. 2. The second embodiment is different from the first embodiment in a protruding length of a top surface protruding portion. This different configuration will be described below. Other configurations are similar to those of the first embodiment, and the same reference numerals as those of the first embodiment are used, and description thereof will be omitted.

As illustrated in FIG. 5, in the first section, a protruding length of a top surface protruding portion 65A in the direction parallel to the third direction is shorter for the inductor wiring located farther in the first direction (forward Z direction). Specifically, the second inductor wiring 22 is located farther on the first direction side than the first inductor wiring 21. Then, a protruding length in the direction parallel to the third direction of a second top surface protruding portion 65*b*A corresponding to the second inductor wiring 22 is shorter than a protruding length in the direction parallel to the third direction of a first top surface protruding portion 65*a*A corresponding to the first inductor wiring 21.

According to the present embodiment, since the protruding length of the top surface protruding portion 65A is shorter for the inductor wiring located farther in the first direction, an area of the magnetic path of the coil 15 is larger at a farther position in the first direction. Accordingly, when the second magnetic layer 12 is filled in the second direction from the first direction side of the coil 15 at the time of manufacturing, the filling of the second magnetic layer 12 in the coil 15 is facilitated, a filling rate is improved, and inductance can be improved.

Third Embodiment

Figure 6:
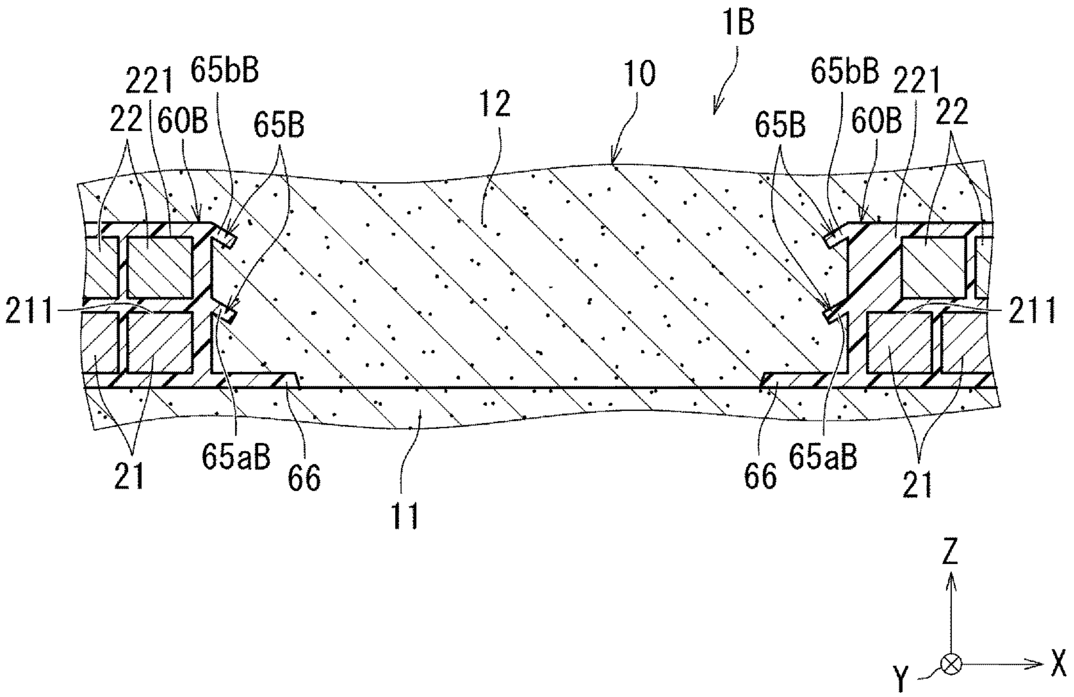
FIG. 6 is a sectional view illustrating a third embodiment of the inductor component.

FIG. 6 is a sectional view illustrating a second embodiment of the inductor component. FIG. 6 is a sectional view corresponding to FIG. 2. A third embodiment is different from the first embodiment in an inclination of the top surface protruding portion. This different configuration will be described below. Other configurations are similar to those of the first embodiment, and the same reference numerals as those of the first embodiment are used, and description thereof will be omitted.

As illustrated in FIG. 6, in the first section, top surface protruding portions 65B are inclined in a second direction (reverse Z direction). To be more specific, each of a first top surface protruding portion 65*a*B and a second top surface protruding portion 65*b*B is inclined in the second direction. The first top surface protruding portion 65*a*B is located farther in the second direction than the top surface 211 of the first inductor wiring 21. The second top surface protruding portion 65*b*B is located farther in the second direction than the top surface 221 of the second inductor wiring 22. Note that, in the first section, each of the first top surface protruding portion 65*a*B and the second top surface protruding portion 65*b*B may be inclined in a first direction. Thus, it is possible to prevent the first inductor wiring 21 and the second inductor wiring 22 from coming off from the element body 10 to the radially outer side.

According to the present embodiment, since the top surface protruding portion 65B is inclined in the second direction, when the second magnetic layer 12 is filled in the second direction from the first direction side of the coil 15 at the time of manufacturing, the second magnetic layer is smoothly filled in the coil 15. In addition, due to the inclination of the top surface protruding portion 65B in the second direction, it is possible to prevent the second magnetic layer 12 from coming off in the first direction after the filling of the second magnetic layer 12, and to further improve adhesion between an insulating layer 60B and the element body 10.

Fourth Embodiment

Figure 7:
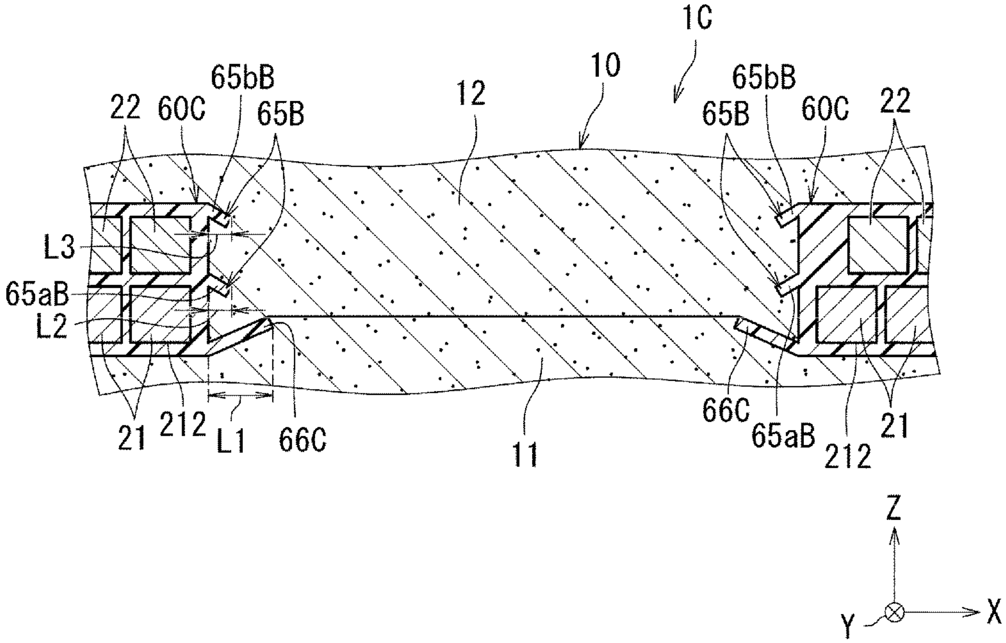
FIG. 7 is a sectional view illustrating a fourth embodiment of the inductor component.

FIG. 7 is a sectional view illustrating a fourth embodiment of the inductor component. FIG. 7 is a sectional view corresponding to FIG. 2. The fourth embodiment is different from the third embodiment in an inclination of a bottom surface protruding portion. This different configuration will be described below. Other configurations are similar to those of the third embodiment, and the same reference numerals as those of the third embodiment are used, and description thereof will be omitted.

As illustrated in FIG. 7, in a first section, a bottom surface protruding portion 66C is inclined in a first direction (forward Z direction). The bottom surface protruding portion 66C is located farther in the first direction than the bottom surface 212 of the first inductor wiring 21. Note that, as in the case of the first embodiment, the protruding length L1 in a direction parallel to a third direction of the bottom surface protruding portion 66C is greater than each of the protruding length L2 in a direction parallel to a third direction of the first top surface protruding portion 65*a*B, and the protruding length L3 in a direction parallel to a third direction of the second top surface protruding portion 65*b*B. Thus, adhesion between the first magnetic layer 11 and the second magnetic layer 12 can be ensured with the bottom surface protruding portion 66C interposed therebetween.

According to the present embodiment, since the bottom surface protruding portion 66C is inclined in the first direction, when the first magnetic layer 11 is filled in the first direction from the second direction side of the coil 15 at the time of manufacturing, the first magnetic layer 11 is smoothly filled in the coil 15. In addition, due to the inclination in the first direction of the bottom surface protruding portion 66C, it is possible to prevent the first magnetic layer 11 from coming off in a second direction after the filling of the first magnetic layer 11, and to further improve adhesion between an insulating layer 60C and the element body 10.

Fifth Embodiment

Figure 8:
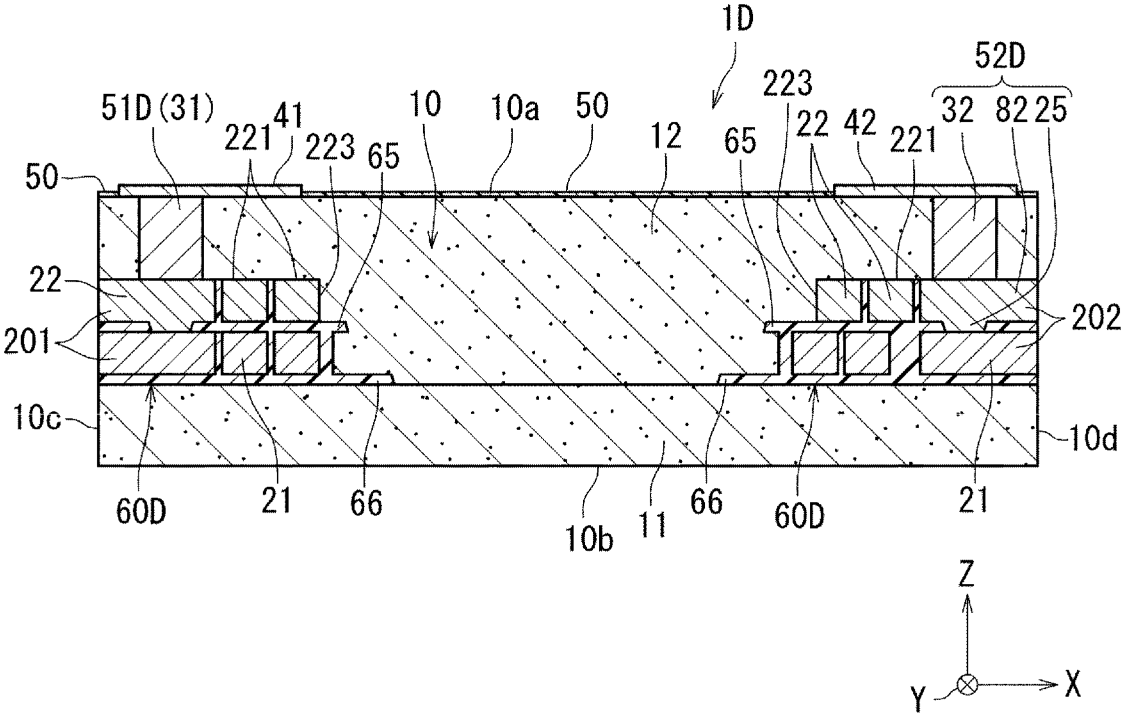
FIG. 8 is a sectional view illustrating a fifth embodiment of the inductor component.

FIG. 8 is a sectional view illustrating a fifth embodiment of the inductor component. FIG. 8 is a sectional view corresponding to FIG. 2. The sixth embodiment is different from the first embodiment in a configuration of an insulating layer and a vertical wiring. This different configuration will be described below. Other configurations are similar to those of the first embodiment, and the same reference numerals as those of the first embodiment are used, and description thereof will be omitted.

As illustrated in FIG. 8, an inductor component 1D according to the present embodiment has a configuration in which a second top surface portion, a first side surface portion in contact with the first side surface 223 of the second inductor wiring 22, and the second top surface protruding portion are mainly removed from the inductor component 1 according to the first embodiment. To be specific, the top surface 221 and the first side surface 223 of the second inductor wiring 22 are not covered with an insulating layer 60D and are in contact with the second magnetic layer 12. In other words, the insulating layer 60D is not provided on the top surface 221 and the first side surface 223 of the second inductor wiring 22, and part of the upper surface of the second connection wiring 82. Further, a region of the upper surface of the second connection wiring 82 excluding a region in which a second vertical wiring 52D is provided is not covered with the insulating layer 60D and is in contact with the second magnetic layer 12. In other words, the insulating layer 60D is not provided in the region of the upper surface of the second connection wiring 82 excluding the region in which the second vertical wiring 52D is provided. A first vertical wiring 51D is configured only with the first columnar wiring 31. The first columnar wiring 31 is directly connected to the upper surface of the second inductor wiring 22. The second vertical wiring 52D is configured with the second columnar wiring 32, the second connection wiring 82, and the via wiring 25. The second columnar wiring 32 is directly connected to the upper surface of the second connection wiring 82.

According to the present embodiment, since it is not necessary to provide the insulating layer on the top surface 221 and the first side surface 223 of the second inductor wiring 22, a manufacturing process can be simplified. In addition, since volume of a magnetic layer can be increased as compared to the case where the insulating layer is provided on the top surface 221 and the first side surface 223, an L value can be improved.

Sixth Embodiment

Figure 9:
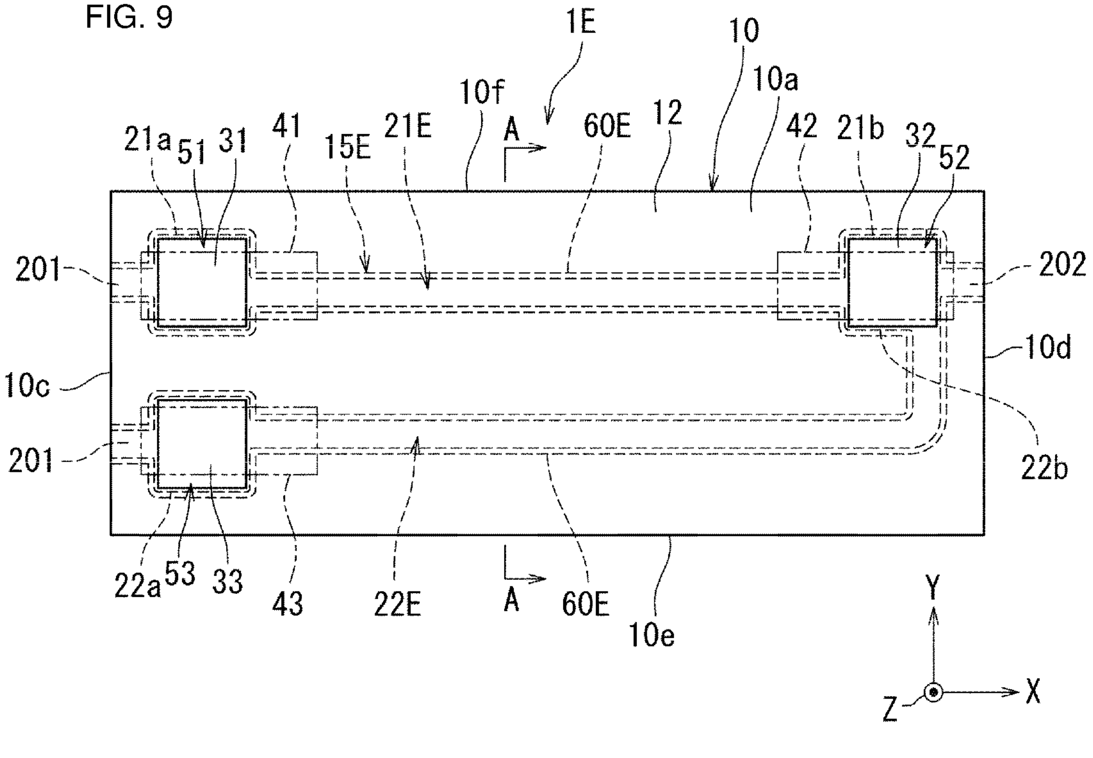
FIG. 9 is a plan view illustrating a sixth embodiment of the inductor component.
Figure 10:
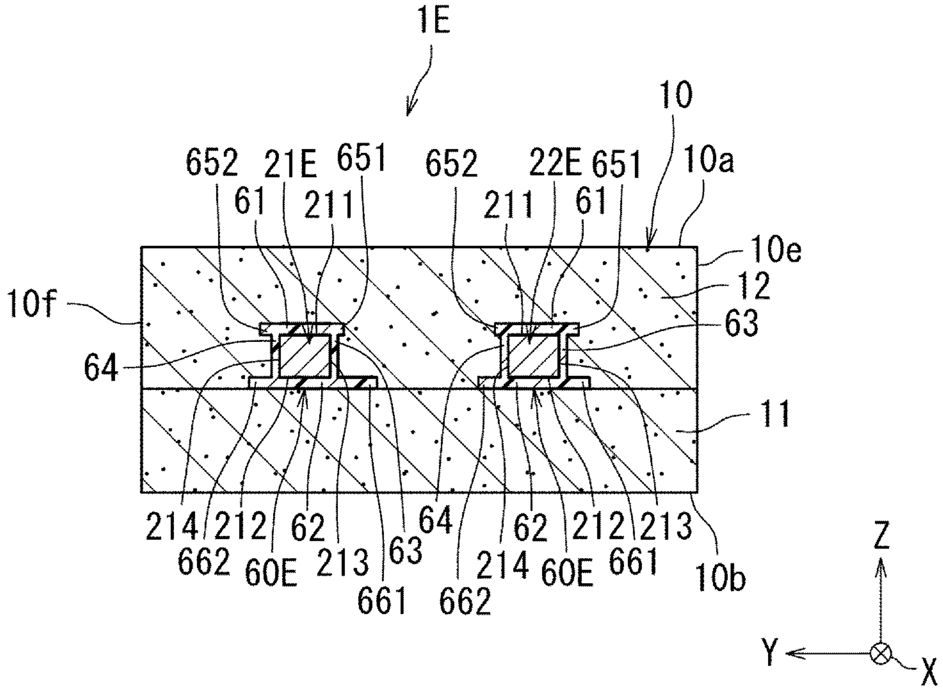
FIG. 10 is a sectional view illustrating the sixth embodiment of the inductor component.

FIG. 9 is a plan view illustrating a sixth embodiment of the inductor component. FIG. 10 is a sectional view taken along line A-A in FIG. 9. The sixth embodiment is different from the first embodiment mainly in a configuration of a coil and an insulating layer. This different configuration will be described below. Other configurations are similar to those of the first embodiment, and the same reference numerals as those of the first embodiment are used, and description thereof will be omitted.

As illustrated in FIG. 9 and FIG. 10, an inductor component 1E includes the element body 10, a coil 15E disposed in the element body 10, a non-magnetic insulating layer 60E covering at least part of the coil 15E, the first vertical wiring 51, the second vertical wiring 52, and a third vertical wiring 53 provided in the element body 10 such that end surfaces thereof are exposed at the first main surface 10*a* of the element body 10, and the first external terminal 41, the second external terminal 42, and a third external terminal 43 exposed at the first main surface 10*a* of the element body 10. In FIG. 1, for convenience, the first to third external terminals 41 to 43 are indicated by two dot chain lines.

The coil 15E has a first inductor wiring 21E and a second inductor wiring 22E. Each of the first inductor wiring 21E and the second inductor wiring 22E extends along a plane orthogonal to a forward Z direction between the first magnetic layer 11 and the second magnetic layer 12. Specifically, the first magnetic layer 11 is present in a reverse Z direction of the first inductor wiring 21E and the second inductor wiring 22E, and the second magnetic layer 12 is present in the forward Z direction of the first inductor wiring 21E and the second inductor wiring 22E and in the direction orthogonal to the forward Z direction.

The first inductor wiring 21E extends linearly along an X direction, as viewed in a Z direction. As viewed in the Z direction, part of the second inductor wiring 22E extends linearly along the X direction, and another part extends linearly along a Y direction, that is, the second inductor wiring 22E extends in an L shape.

A first end portion 21*a* of the first inductor wiring 21E is electrically connected to the first vertical wiring 51, and a second end portion 21*b* of the first inductor wiring 21E is electrically connected to the second vertical wiring 52. In other words, the first inductor wiring 21E has pad portions each having a large line width at the first and second end portions 21*a* and 21*b* and is directly connected to the first and second vertical wirings 51 and 52 at the respective pad portions.

A first end portion 22*a* of the second inductor wiring 22E is electrically connected to the third vertical wiring 53, and a second end portion 22*b* of the second inductor wiring 22E is electrically connected to the second vertical wiring 52. In other words, the second inductor wiring 22E has a pad portion at the first end portion 22*a*, and is directly connected to the third vertical wiring 53, at the pad portion. The second end portion 22*b* of the second inductor wiring 22E is common to the second end portion 21*b* of the first inductor wiring 21E.

The first end portion 21*a* of the first inductor wiring 21E and the first end portion 22*a* of the second inductor wiring 22E are located on a side of the first side surface 10*c* of the element body 10, as viewed in the Z direction. The second end portion 21*b* of the first inductor wiring 21E and the second end portion 22*b* of the second inductor wiring 22E are located on a side of the second side surface 10*d* of the element body 10, as viewed in the Z direction.

The first and second vertical wirings 51 and 52 and the third vertical wiring 53 extend in the Z direction from the inductor wirings 21E and 22E, respectively, and penetrate inside the second magnetic layer 12. The first vertical wiring 51 extends from an upper surface of the first end portion 21*a* of the first inductor wiring 21E to the first main surface 10*a* of the element body 10, and an end surface of the first vertical wiring 51 is exposed at the first main surface 10*a* of the element body 10. The second vertical wiring 52 extends from an upper surface of the second end portion 21*b* of the first inductor wiring 21A to the first main surface 10*a* of the element body 10, and an end surface of the second vertical wiring 52 is exposed at the first main surface 10*a* of the element body 10. The third vertical wiring 53 extends from an upper surface of the first end portion 22*a* of the second inductor wiring 22E to the first main surface 10*a* of the element body 10, and an end surface of the third vertical wiring 53 is exposed at the first main surface 10*a* of the element body 10.

Thus, the first vertical wiring 51 and the second vertical wiring 52, and the third vertical wiring 53 linearly extend from the first inductor wiring 21E and the second inductor wiring 22E, respectively, to the end surfaces exposed at the first main surface 10*a* in a direction orthogonal to the first main surface 10*a*. This makes it possible to connect the first external terminal 41 and the second external terminal 42, and the third external terminal 43 to the first inductor wiring 21E and the second inductor wiring 22E, respectively, with shorter distances, and to achieve lower resistance and higher inductance of the inductor component 1E.

The first vertical wiring 51 has a via wiring (not illustrated) penetrating inside the insulating layer 60, and the first columnar wiring 31 extending upward from the via wiring, and penetrating inside the second magnetic layer 12. The second vertical wiring 52 has a via wiring (not illustrated) penetrating inside the insulating layer 60, and the second columnar wiring 32 extending upward from the via wiring, and penetrating inside the second magnetic layer 12. The third vertical wiring 53 has a via wiring (not illustrated) penetrating inside the insulating layer 60, and a third columnar wiring 33 extending upward from the via wiring, and penetrating inside the second magnetic layer 12.

The first to the third external terminals 41 to 43 are provided on the first main surface 10*a* of the element body 10. The first external terminal 41 is in contact with the end surface, of the first vertical wiring 51, exposed at the first main surface 10*a* of the element body 10, and is electrically connected to the first vertical wiring 51. Thus, the first external terminal 41 is electrically connected to the first end portion 21*a* of the first inductor wiring 21E. The second external terminal 42 is in contact with the end surface, of the second vertical wiring 52, exposed at the first main surface 10*a* of the element body 10, and is electrically connected to the second vertical wiring 52. Thus, the second external terminal 42 is electrically connected to the second end portion 21*b* of the first inductor wiring 21E and the second end portion 22*b* of the second inductor wiring 22E. The third external terminal 43 is in contact with the end surface of the third vertical wiring 53, is electrically connected to the third vertical wiring 53, and is electrically connected to the first end portion 22*a* of the second inductor wiring 22E.

As illustrated in FIG. 10, in a first section orthogonal to the extending directions of the first inductor wiring 21E and the second inductor wiring 22E, each of the first inductor wiring 21E and the second inductor wiring 22E has the top surface 211 facing the forward Z direction, the bottom surface 212 facing the reverse Z direction, the first side surface 213 facing the reverse Y direction, and the second side surface 214 facing a forward Y direction.

In FIG. 10, the forward Z direction corresponds to "a first direction" described in the claims, the reverse Z direction corresponds to "a second direction as a reverse direction of the first direction" described in the claims, the reverse Y direction corresponds to "a third direction orthogonal to the first direction" described in the claims, and the forward Y direction corresponds to "a fourth direction as a reverse direction of the third direction" described in the claims. Hereinafter, description as "first to fourth directions" may be used.

The insulating layer 60E has a top surface portion 61 located farther in the first direction than the top surface 211, the bottom surface portion 62 located farther in the second direction than the bottom surface 212, the first side surface portion 63 in contact with first side surface 213, the second side surface portion 64 in contact with second side surface 214, a first top surface protruding portion 651 provided at a position at which the first top surface protruding portion 651 protrudes from the top surface portion 61 farther in the third direction than the first side surface portion 63, a second top surface protruding portion 652 provided at a position at which the second top surface protruding portion 652 protrudes from the top surface portion 61 farther in the fourth direction than the second side surface portion 64, a first bottom surface protruding portion 661 provided at a position at which the first bottom surface protruding portion 661 protrudes from the bottom surface portion 62 farther in the third direction than the first side surface portion 63, and a second bottom surface protruding portion 662 provided at a position at which the second bottom surface protruding portion 662 protrudes from the bottom surface portion 62 farther in the fourth direction than the second side surface portion 64. The top surface portion 61 is in contact with the top surface 211, the first side surface portion 63, and the second side surface portion 64, and the bottom surface portion 62 is in contact with the bottom surface 212, the first side surface portion 63, and the second side surface portion 64.

The first bottom surface protruding portion 661 and the second bottom surface protruding portion 662 are located between the first magnetic layer 11 and the second magnetic layer 12. The first magnetic layer 11 and the second magnetic layer 12 are in contact with each other at a tip of the first bottom surface protruding portion 661 and a tip of the second bottom surface protruding portion 662. In other words, each of the first bottom surface protruding portion 661 and the second bottom surface protruding portion 662 is located between the first magnetic layer 11 and the second magnetic layer 12, and a lower surface on the second direction side is in contact with a contact surface of the first magnetic layer 11 with the second magnetic layer 12, and the tip is in contact with the second magnetic layer 12. A protruding length in the direction parallel to the third direction of the first bottom surface protruding portion 661 is greater than each of a protruding length in the direction parallel to the third direction of the first top surface protruding portion 651, and a protruding length in the direction parallel to the fourth direction of the second top surface protruding portion 652. A protruding length in the direction parallel to the third direction of the second bottom surface protruding portion 662 is greater than each of the protruding length in the direction parallel to the third direction of the first top surface protruding portion 651, and the protruding length in the direction parallel to the fourth direction of the second top surface protruding portion 652.

According to the present embodiment, adhesion between the first magnetic layer 11 and the second magnetic layer 12 can be ensured by the first bottom surface protruding portion 661 and the second bottom surface protruding portion 662 each having the protruding length being relatively long. In addition, a contact area between the insulating layer 60E and the element body 10 is increased by the first top surface protruding portion 651 and the second top surface protruding portion 652, and additionally, adhesion between the insulating layer 60E and the element body 10 is improved by the first top surface protruding portion 651 and the second top surface protruding portion 652 biting into the element body 10. As described above, the adhesion between the insulating layer 60E and the element body 10 can be improved. Furthermore, according to the present embodiment, the first magnetic layer 11 and the second magnetic layer 12 are in contact with each other at the tip of the first bottom surface protruding portion 661 and the tip of the second bottom surface protruding portion 662. Accordingly, it is possible to increase the volume of the second magnetic layer 12, as compared to the case where the tip of the first bottom surface protruding portion 661 and the tip of the second bottom surface protruding portion 662 are in contact with each other, and the first bottom surface protruding portion 661 and the second bottom surface protruding portion 662 are connected to each other. As a result, efficiency of obtaining inductance can be improved. As described above, according to the inductor component 1E, the adhesion between the insulating layer 60E and the element body 10 can be improved, and inductor characteristics can also be improved.

In addition, since the first and second top surface protruding portions 651, 652, the first and second bottom surface protruding portions 661, and 662 are provided, it is possible to more effectively increase the contact area between the insulating layer 60E and the element body 10, and to make the first and second top surface protruding portions 651, 652, the first and second bottom surface protruding portions 661, and 662 bite into the element body 10 more firmly. Thus, the adhesion between the insulating layer 60E and the element body 10 can be further improved.

Preferably, in the first section, the protruding length in the direction parallel to the third direction of the first top surface protruding portion 651 is different from the protruding length in the direction parallel to the fourth direction of the second top surface protruding portion 652.

According to the above configuration, by increasing the length of one of the first top surface protruding portion 651 and the second top surface protruding portion 652, it is possible to further improve the adhesion between the insulating layer 60E and the element body 10. In addition, by decreasing the length of another of the first top surface protruding portion 651 and the second top surface protruding portion 652, it is possible to reduce the magnetic resistance of the magnetic path and improve the efficiency of obtaining inductance.

Preferably, in the first section, the protruding length in the direction parallel to the third direction of the first bottom surface protruding portion 661 is different from the protruding length in the direction parallel to the fourth direction of the second top surface protruding portion 652.

According to the above configuration, by increasing the length of one of the first bottom surface protruding portion 661 and the second bottom surface protruding portion 662, it is possible to further improve the adhesion between the insulating layer 60E and the element body 10. In addition, by decreasing the length of the other of the first bottom surface protruding portion 661 and the second bottom surface protruding portion 662, it is possible to reduce the magnetic resistance of the magnetic path and improve the efficiency of obtaining inductance.

Note that, the present disclosure is not limited to the above-described embodiments, and design changes can be made without departing from the scope of the present disclosure. For example, the features of the first to sixth embodiments may be combined in various ways.

In the embodiment described above, the "inductor wiring", when a current flows therethrough, gives inductance to the inductor component by generating a magnetic flux in the magnetic layer, and the structure, the shape, the material, and the like, thereof are not particularly limited. In particular, the present disclosure is not limited to the straight line or the curve (a spiral=a two dimensional curve) extending on the plane as in the embodiments, and various known wiring shapes such as a meander wiring can be used.

In the first to fifth embodiments, the inductor wirings are in the two layers, but may be in one layer. In the sixth embodiment, the inductor wirings are in the one layer, but may be in two or more layers. With one layer, the thickness of the inductor component can be reduced. With two or more layers, the number of turns of the inductor wiring can be increased, so that the inductance can be increased.

In the first to fifth embodiments, each of the top surface protruding portion and the bottom surface protruding portion is provided at corresponding one of the positions at which the top surface protruding portion and the bottom surface protruding portion protrude farther in the third direction than the first side surface portion but may be provided at at least corresponding one of the positions at which the top surface protruding portion and the bottom surface protruding portion protrude farther in the third direction than the first side surface portion and corresponding one of the positions at which the top surface protruding portion and the bottom surface protruding portion protrude farther in the fourth direction than the second side surface portion. In other words, in the first embodiment, each of the top surface protruding portion and the bottom surface protruding portion is provided so as to protrude into the inner magnetic path of the coil but only needs to be provided so as to protrude into any one of the inner magnetic path and the outer magnetic path of the coil.

In the sixth embodiment, each of the top surface protruding portion and the bottom surface protruding portion is provided at both of corresponding one of the positions at which the top surface protruding portion and the bottom surface protruding portion protrude farther in the third direction than the first side surface portion and corresponding one of the positions at which the top surface protruding portion and the bottom surface protruding portion protrude farther in the fourth direction than the second side surface portion but only needs to be provided at at least one of a position at which the top surface protruding portion and the bottom surface protruding portion protrude farther in the third direction than the first side surface portion and a position at which the top surface protruding portion and the bottom surface protruding portion protrude farther in the fourth direction than the second side surface portion.

What is claimed is:

1. An inductor component, comprising:

an element body;

a coil in the element body; and a non-magnetic insulating layer configured to cover at least part of the coil, wherein the element body includes a first magnetic layer and a second magnetic layer stacked in order along a first direction, the coil includes an inductor wiring extending along a plane orthogonal to the first direction between the first magnetic layer and the second magnetic layer, in a first section orthogonal to an extending direction of the inductor wiring, the inductor wiring includes a top surface facing the first direction, a bottom surface facing a second direction opposite to the first direction, a first side surface facing a third direction orthogonal to the first direction, and a second side surface facing a fourth direction opposite to the third direction, the insulating layer includes a top surface portion located farther in the first direction than the top surface, a bottom surface portion located farther in the second direction than the bottom surface, a first side surface portion in contact with the first side surface, a second side surface portion in contact with the second side surface, a top surface protruding portion provided at at least one of a position at which the top surface protruding portion protrudes from the top surface portion farther in the third direction than the first side surface portion and a position at which the top surface protruding portion protrudes from the top surface portion farther in the fourth direction than the second side surface portion, and a bottom surface protruding portion provided at at least one of a position at which the bottom surface protruding portion protrudes from the bottom surface portion farther in the third direction than the first side surface portion and a position at which the bottom surface protruding portion protrudes from the bottom surface portion farther in the fourth direction than the second side surface portion, the bottom surface protruding portion is between the first magnetic layer and the second magnetic layer, the first magnetic layer and the second magnetic layer are in contact with each other at a tip of the bottom surface protruding portion, and a protruding length of the bottom surface protruding portion in a direction parallel to the third direction or the fourth direction is greater than a protruding length of the top surface protruding portion in the direction parallel to the third direction or the fourth direction.

2. The inductor according to claim 1, wherein the inductor wiring includes multiple layers along the first direction, the multiple inductor wirings are connected in series and configure one or more turns of the coil, and the third direction is an inner surface direction of the coil.

3. The inductor component according to claim 1, wherein three or more of the top surface protruding portion and the bottom surface protruding portion are in the first section, and in the first section, at least three of the top surface protruding portion and the bottom surface protruding portion have protruding lengths different from each other in the direction parallel to the third direction or the fourth direction.

4. The inductor component according to claim 1, wherein the inductor wiring includes multiple layers along the first direction, and in the first section, a protruding length of the top surface protruding portion in the direction parallel to the third direction or the fourth direction is shorter for an inductor wiring located farther in the first direction.

5. The inductor component according to claim 1, wherein the inductor wiring includes multiple layers along the first direction, and in the first section, the top surface protruding portion is slanted in the second direction.

6. The inductor component according to claim 1, wherein in the first section, a protruding direction of the bottom surface protruding portion is parallel to the third direction or the fourth direction.

7. The inductor component according to claim 1, wherein in the first section, the bottom surface protruding portion is slanted in the first direction.

8. The inductor component according to claim 1, wherein the inductor wiring includes multiple layers along the first direction, the multiple inductor wirings are connected in series and configure one or more turns of the coil, and in the first section, each of the top surface protruding portion and the bottom surface protruding portion is located in an inner magnetic path or an outer magnetic path of the coil.

9. The inductor component according to claim 1, wherein the top surface protruding portion includes a protruding portion protruding in the third direction and a protruding portion protruding in the fourth direction, and the bottom surface protruding portion includes a protruding portion protruding in the third direction and a protruding portion protruding in the fourth direction.

10. The inductor component according to claim 1, wherein the top surface protruding portion includes a protruding portion protruding in the third direction and a protruding portion protruding in the fourth direction, and in the first section, a protruding length of the protruding portion protruding in the direction parallel to the third direction is different from a protruding length of the protruding portion protruding in the direction parallel to the fourth direction.

11. The inductor component according to claim 1, wherein the bottom surface protruding portion includes a protruding portion protruding in the third direction and a protruding portion protruding in the fourth direction, and in the first section, a protruding length of the protruding portion protruding in the direction parallel to the third direction is different from a protruding length of the protruding portion protruding in the direction parallel to the fourth direction.

12. The inductor component according to claim 1, wherein in the first section, the top surface protruding portion is slanted in the first direction or the second direction.

13. The inductor component according to claim 1, wherein a thickness of the bottom surface portion of the insulating layer is less than a thickness of the top surface portion.

14. The inductor component according to claim 1, wherein the inductor wiring is in each of n (n: natural number, n≥2) layers along the first direction, and a material of an insulating layer covering an inductor wiring of a first layer is different from a material of an insulating layer covering an inductor wiring of an m-th (m: natural number, 2≤m≤n) layer.

15. The inductor component according to claim 2, wherein three or more of the top surface protruding portion and the bottom surface protruding portion are in the first section, and in the first section, at least three of the top surface protruding portion and the bottom surface protruding portion have protruding lengths different from each other in the direction parallel to the third direction or the fourth direction.

16. The inductor component according to claim 2, wherein the inductor wiring is in each of multiple layers along the first direction, and in the first section, a protruding length of the top surface protruding portion in the direction parallel to the third direction or the fourth direction is shorter for an inductor wiring located farther in the first direction.

17. The inductor component according to claim 2, wherein the inductor wiring is in each of multiple layers along the first direction, and in the first section, the top surface protruding portion is slanted in the second direction.

18. The inductor component according to claim 2, wherein in the first section, a protruding direction of the bottom surface protruding portion is parallel to the third direction or the fourth direction.

* * * * *